United States Patent
Dutta

(10) Patent No.: US 11,296,983 B1
(45) Date of Patent: Apr. 5, 2022

(54) STATELESS MULTICASTING OVER TRAFFIC ENGINEERED UNICAST TUNNELS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 17/030,060

(22) Filed: Sep. 23, 2020

(51) Int. Cl.
| H04L 12/715 | (2013.01) |
| H04L 12/721 | (2013.01) |
| H04L 12/723 | (2013.01) |
| H04L 45/64 | (2022.01) |
| H04L 45/302 | (2022.01) |
| H04L 45/00 | (2022.01) |
| H04L 45/24 | (2022.01) |
| H04L 45/50 | (2022.01) |

(52) U.S. Cl.
CPC .............. H04L 45/64 (2013.01); H04L 45/24 (2013.01); H04L 45/302 (2013.01); H04L 45/38 (2013.01); H04L 45/50 (2013.01)

(58) Field of Classification Search
CPC ......... H04L 45/64; H04L 45/50; H04L 45/24; H04L 45/302; H04L 45/38
See application file for complete search history.

(56) References Cited

U.S. PATENT DOCUMENTS

| 7,372,853 | B2 | 5/2008 | Sharma et al. | |
| 8,169,924 | B2 * | 5/2012 | Sajassi | H04L 45/00 370/249 |
| 8,310,957 | B1 | 11/2012 | Rekhter | |
| 10,616,063 | B1 * | 4/2020 | Dutta | H04L 65/607 |
| 11,095,555 | B2 * | 8/2021 | Dutta | H04L 45/28 |
| 2021/0044538 | A1 * | 2/2021 | Hu | H04L 12/4633 |

OTHER PUBLICATIONS

Aggarwal, "Multicast in Virtual Private LAN Service (VPLS)", Internet Engineering Task Force (IETF), RFC 7117, Feb. 2014, 50 pages.

Aggarwal, "Extensions to Resource Reservation Protocol—Traffic Engineering (RSVP-TE) for Point-to-Multipoint TE Label Switched Paths (LSPs)", Network Working Group, RFC 4875, May 2007, 53 pages.

(Continued)

Primary Examiner — Mohamed A Kamara
(74) Attorney, Agent, or Firm — Tong, Rea, Bentley & Kim, LLC

(57) ABSTRACT

A software defined networking (SDN) controller or routers in a network determine unicast paths from an ingress router to egress routers from the network based on quality-of-service (QoS) metrics for links between routers of the network. A subset of the unicast paths is associated with a multicast flow based on one or more QoS criteria for the multicast flow. A router pushes a label stack onto a packet of the multicast flow. The label stack includes labels that identify the subset of the unicast paths. The packet including the label stack is multicast through the network to the egress routers. Routers that receive the multicast packet selectively modify the label stack in the packet based on the labels that identify the subset of the unicast paths. The routers selectively forward the packet based on the labels.

30 Claims, 17 Drawing Sheets

(56) References Cited

OTHER PUBLICATIONS

Aggarwal, "BGP Encodings and Procedures for Multicast in MPLS/BGP IP VPNs", Internet Engineering Task Force (IETF), RFC 6514, Feb. 2012, 59 pages.
Pan, "Fast Reroute Extensions to RSVP-TE for LSP Tunnels", Network Working Group, RFC 4090, May 2005, 38 pages.
Filsfils, "Segment Routing Architecture", Internet Engineering Task Force (IETF), RFC 8402, Jul. 2018, 32 pages.
Rosen, "Multicast in MPLS/BGP IP VPNs", Internet Engineering Task Force (IETF), RFC 6513, Feb. 2012, 88 pages.
Rosen, "Multicast Label Switching Architecture", Network Working Group, RFC 3031, Jan. 2001, 61 pages.
Sajassi, "BGP MPLS-Based Ethernet VPN", Internet Engineering Task Force (IETF), RFC 7432, Feb. 2015, 56 pages.
Rosen, "Using BGP to Bind MPLS Labels to Address Prefixes", Internet Engineering Task Force (IETF), RFC 8277, Oct. 2017, 23 pages.
Filsfils, "Segment Routing Policy Architecture", SPRING Working Group, Internet-Draft, Dec. 14, 2019, 35 pages.
Wijnands, "Label Distribution Protocol Extensions for Point-to-Multipoint and Multipoint-to-Multipoint Label Switched Paths", Internet Engineering Task Force (IETF), RFC 6388, Nov. 2011, 39 pages.
Awduche, "RSVP-TE: Extensions to RSVP for LSP Tunnels", Network Working Group, RFC 3209, Dec. 2001, 61 pages.
EP Search Report mailed in corresponding EP 211 94470.7 dated Jan. 28, 2022, 14 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |              EMLS-TEI          | Exp |S|        TTL           |
 +-+-+-+-+-+-+-+-+-+-+-+-+-+-+-+-+-+-+-+-+-+-+-+-+-+-+-+-+-+-+-+-+
 | Type|    Num Labels(N)         | Exp |S|        TTL           |
 +-+-+-+-+-+-+-+-+-+-+-+-+-+-+-+-+-+-+-+-+-+-+-+-+-+-+-+-+-+-+-+-+
 |                                                               |
 +                                                               +
 //             EMLS-TE Label Stack   (Variable)                //
 //                                                             //
 |                                                               |
 +-+-+-+-+-+-+-+-+-+-+-+-+-+-+-+-+-+-+-+-+-+-+-+-+-+-+-+-+-+-+-+-+
```

FIG. 5

```
 +-+-+-+-+-+-+-+-+-+-+-+-+-+-+-+-+-+-+-+-+-+-+-+-+-+-+-+-+-+-+-+-+
 | Type|    Num Labels(N)         | Exp |S|        TTL           |
 +-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label 1                | Exp |0|      TTL      |
+-+-+-+-+-+-+-+-+-+-+-+-+-+-+-+-+-+-+-+-+-+-+-+-+-+-+-+-+-+-+-+-+
|                Label 2                | Exp |0|      TTL      |
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
|                Label N                | Exp |S|      TTL      |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               EMLS-TEI                | Exp |0|      TTL      |
+-+-+-+-+-+-+-+-+-+-+-+-+-+-+-+-+-+-+-+-+-+-+-+-+-+-+-+-+-+-+-+-+
| 0x4 |     Num Labels = 3              | Exp |0|      TTL      |
+-+-+-+-+-+-+-+-+-+-+-+-+-+-+-+-+-+-+-+-+-+-+-+-+-+-+-+-+-+-+-+-+
|              L_R1_R2_1_5              | Exp |0|      TTL      |
+-+-+-+-+-+-+-+-+-+-+-+-+-+-+-+-+-+-+-+-+-+-+-+-+-+-+-+-+-+-+-+-+
|              L_R1_R3_1_5              | Exp |0|      TTL      |
+-+-+-+-+-+-+-+-+-+-+-+-+-+-+-+-+-+-+-+-+-+-+-+-+-+-+-+-+-+-+-+-+
|              L_R1_R4_1_5              | Exp |S|      TTL      |
+-+-+-+-+-+-+-+-+-+-+-+-+-+-+-+-+-+-+-+-+-+-+-+-+-+-+-+-+-+-+-+-+
```

FIG. 8

STATELESS MULTICASTING OVER TRAFFIC ENGINEERED UNICAST TUNNELS

BACKGROUND

Multiprotocol label switching (MPLS) is used to route data between nodes of a network based on labels instead of network addresses, thereby avoiding complex address lookups in a routing table. The labels identify virtual links (or paths) between nodes, which are referred to herein as label switched paths (LSPs). An LSP begins at a label edge router (LER) that is an ingress router for the path and traverses one or more label switched routers (LSRs) before ending at an LER that is an egress router for the LSP. To send a packet along an LSP, the ingress router pushes a label onto the packet. The label is assigned to the LSP by the next hop LSR in the path. The ingress router then sends the labeled packet to the next hop LSR. In response to receiving a packet, an LSR uses the label value in the topmost entry of the label stack to determine the next hop for the packet, e.g., using a lookup table that contains states of LSPs. The LSR then performs operations on the label stack based on the information in the topmost entry. For example, the LSR can swap the topmost label with a new label. For another example, the LSR can push a new label on top of the existing label to encapsulate the packet in another layer of MPLS. For yet another example, if the LSR is the egress router of the LSP associated with a topmost label, the LSR pops the topmost label from the packet.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a traffic engineered explicit multicast label stack (EMLS-TE) according to some embodiments.

FIG. 6 is an EMLS-TE descriptor according to some embodiments.

FIG. 7 is a label stack for an EMLS-TE according to some embodiments.

FIG. 8 is an EMLS-TE that is pushed onto a packet to some embodiments.

DETAILED DESCRIPTION

Figure 1:
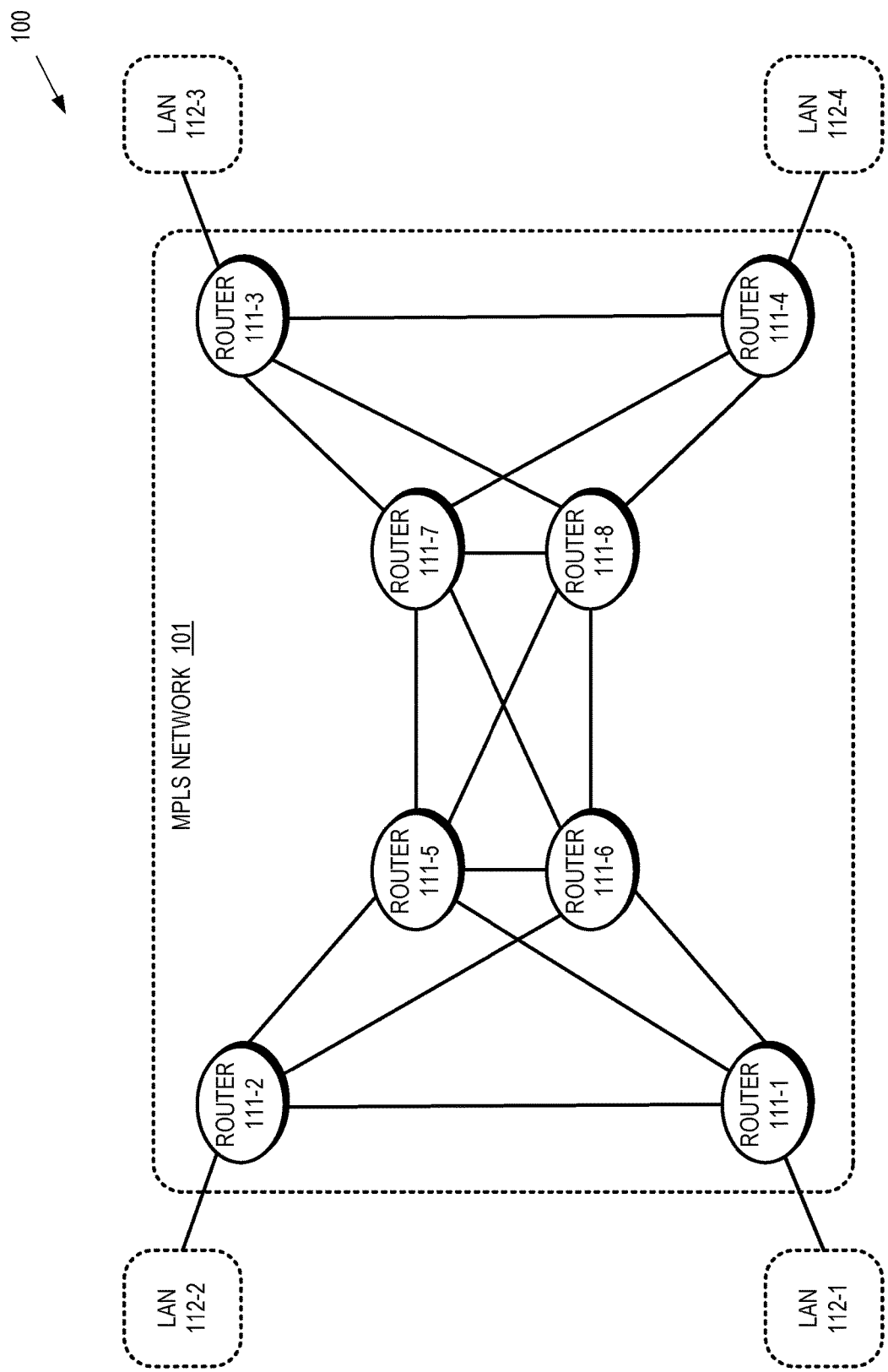
FIG. 1 is a block diagram of a communication system that implements stateful multiprotocol label switching (MPLS) multicasting according to some embodiments.

Multiprotocol label switching (MPLS) is implemented using label switched paths (LSPs) of two types—Best-Effort LSPs (BE-LSP) and Traffic Engineered LSPs (TE-LSP). The paths of BE-LSPs between routers in a network are determined using link state protocols such as open shortest path first (OSPF, OSPFv3), intermediate system-to-intermediate system (IS-IS), and the like. The link state protocol floods the status of locally connected networks and links of the routers across the network. Each router in the network builds an identical copy of the network topology based on the status information and then independently computes the paths to every other router (and any advertised networks), using path algorithms such as Dijkstra's Shortest Path First (SPF) algorithm, which computes the shortest paths between the nodes in a graph that represents the routers in the network. In response to the SPF computation, the routers program routing tables, e.g., to indicate next hop routers for unicast paths to different egress routers. The paths are associated with labels that are associated with the BE-LSP that follows the shortest paths to the egress routers. The egress router is an endpoint of the BE-LSP and there is only one BE-LSP to each egress router since the BE-LSP identifies the egress router. As used herein, the term "best effort" indicates that an LSR does not provide any guarantee that the packets are delivered or that delivery meets any quality-of-service (QoS) requirements. Best effort packets are conveyed at an unspecified variable bit rate and latency and packet loss rates that depend on the current traffic load.

In contrast to BE-LSPs, TE-LSPs follow a path that satisfies QoS requirements of the packets transported over the TE-LSP. Each link in the network is assigned a set of TE metrics. Examples of TE metrics include a configured bandwidth, an available bandwidth that is equal to the configured bandwidth minus the bandwidth reserved by (or allocated to) existing flows, a delay, a color, a preference, an affinity, and the like. The TE metrics are flooded by the link state protocols. Using the flooded information, each router in the network builds a TE database (TEDB) that includes a copy of the TE metrics of the links in the network. The routers in the network build identical copies of the TEDB. The path of a TE-LSP between ingress and egress router is computed by CSPF (Constraint Shortest Path First) computation on TEDB with QoS as the constraint. The path is associated with labels that identify the TE-LSP. Once the TE-LSP is set up, the TE metrics of links along its path are updated based on QoS resources reserved for the TE-LSP. For example, available bandwidth on the links are decremented by the bandwidth used by the TE-LSP. Unlike the BE-LSPs, there could be multiple TE-LSPs between a pair of ingress and egress routers, each set up with a specific QoS.

Multicasting allows a source to transmit a single packet to multiple receivers via a multicast distribution tree (MDT) including nodes along the MDT from an ingress router associated with the source to the egress routers associated with the receivers of the multicast packet. The nodes in the MDT selectively replicate the packet when the MDT branches into multiple paths towards different next hop nodes or egress routers. The MDT can be implemented as a point-to-multipoint tree that connects a single source to multiple receivers or a multipoint-to multipoint tree that connects multiple sources to multiple receivers, e.g., in a mesh network. Multicasting with MPLS is implemented in a stateful version and a stateless version. In stateful MPLS multicasting, the routers maintain control plane and data plane states that represent the MDT. The routers forward or replicate multicast packets based on the state that is stored in the router. In stateless MPLS multicasting, the routers do not maintain any control plane or data plane states for an MDT. An ingress router prefixes a packet with a label stack including the labels of the BE-LSPs to all egress routers. The ingress router replicates the packet to the next hops associated with the labels, e.g., based on states of the BE-LSPs. Labels that share the same next hop are included in the label stack of the packet replicated to the next hop. In response to receiving a packet, an LSR looks up each label in the label stack to determine the next hop, e.g., using a lookup table that contains the states of BE-LSPs. For example, an LSR can swap a label with a new label to the corresponding next hop. For another example, if the LSR is the egress router for the BE-LSP associated with the label, the LSR makes a local copy of the packet, pops the entire label stack from the packet copy, and forwards the packet to a multicast overlay such as a virtual private network (VPN) or other application that is using the multicast flow.

Stateless MPLS multicasting provides BE delivery of packets because the packets are sent along an MDT including paths composed of unicast BE-LSPs from ingress routers to egress routers. Consequently, delivery of packets does not meet QoS requirements and packets are conveyed at an unspecified variable bit rate and latency and packet loss rates, depending on the current traffic load. The stateless model is therefore agnostic to the QoS requirements of applications. Moreover, all the packets multicast from an ingress router to a set of egress routers follow the same MDT, which concentrates traffic along the MDT.

Stateful traffic engineered MPLS multicasting can be used to implement QoS aware multicast flows by identifying paths based on TE metrics associated with the links between the nodes. An ingress router computes a unicast path to each egress router of the multicast flow such that the path satisfies the QoS requested by the flow. The ingress router sets up unicast TE-LSPs along the computed paths to each egress router, which are referred to as S2Ls (Source to Leafs). The TE-LSPs are bound by a common MDT identifier, so when two or more TE-LSPs traverse a common path then they form a single state in the data plane. As a result, the S2Ls form a TE-MDT for the multicast flow. A TE-MDT is difficult to scale up to larger networks of routers or nodes, at least in part because the ingress router associated with a source sets up and maintains independent unicast TE-LSPs (S2Ls) to each egress router of the TE-MDT. The ingress router then needs to store state information in the control plane for each independent unicast TE-LSP. If the TE-MDT includes fifty egress routers, then the TE-MDT would signal and maintain fifty TE-LSPs. Periodic refreshes are transmitted along the path of unicast TE-LSP/S2Ls and the refreshes impose a limit on the maximum number of TE-MDTs that are supported in the network. Typically, a router does not scale to more than about 500 TE-MDTs.

Stateless traffic engineered MPLS generates labels for the links and routers using a global label space or local label spaces for the routers plus unique identifiers of the routers. Each link is assigned a set of TE metrics. A centralized controller maintains a TEDB for the network. An ingress router requests that the controller compute an explicit path tree for a multicast flow with a specified or target QoS. In response to receiving a request from an ingress router including the requested QoS, the controller computes an explicit path tree (e.g., a traffic engineered MDT, TE-MDT) that meets the requested QoS. The explicit path tree includes the links that constitute the tree. The controller also updates any dynamic metrics (e.g., the available bandwidth) on the links by reserving the QoS resources required by the flow. To send a packet along the explicit path tree, the ingress router pushes a label stack onto the packet. Each label identifies a link in the tree or an egress router. As used herein, the term "label" refers to either a label from a global label space or a label plus unique identifier of a router that allocated the label from its local label space. The ingress router evaluates the label stack to look for the labels that identify its directly connected links. Matching labels are removed from the label stack and the packet is replicated along each link. In response to receiving a packet, a router replicates the packet on its directly connected links in the tree based on labels in the label stack of the packet. If a label identifies the receiving router, then the router makes a local copy of the packet, removes the label stack, and forwards the packet to a multicast overlay such as a virtual private network (VPN) or other application that is using the multicast flow. Eventually, a copy of the packet reaches each egress router after traversing the explicit path tree (TE-MDT) and without requiring TE-MDT specific states in the transit routers. This solution requires a centralized controller and assignment of labels to each link. Moreover, the overhead of the label stack on the packet is not optimal because it encodes all links in the explicit path tree, in addition to the egress routers.

FIGS. 1-19 disclose techniques for scalable stateless traffic engineered multiprotocol label switching (TE-MPLS) multicast in a network. Unicast paths (e.g., TE-LSPs) from an ingress router to egress routers are determined based on quality-of-service (QoS) metrics for links between nodes of the network. In some embodiments, the unicast paths satisfy QoS criteria such as requirements for a configured bandwidth, an available bandwidth, a delay, a latency, a color, an affinity, and the like. An ingress router for a multicast flow selects a subset of the unicast paths from the ingress router to a subset of the egress routers for the multicast flow. The ingress router selects the subset of the unicast paths based on one or more QoS criteria associated with the multicast flow. If the ingress router is unable to identify a unicast path to one of the egress routers that meets the QoS criteria, the ingress router can reoptimize an existing unicast path based on the QoS criteria or configure a new unicast path (e.g., a TE-LSP) to the egress router that meets the QoS criteria for the multicast flow.

To send a packet along the multicast flow, the ingress router pushes a label stack onto the packet. The label stack includes labels that identify the subset of the unicast paths to the egress routers. The ingress router then forwards one or more copies of the packet to one or more next hop routers in the network. In response to receiving the packet, a router in the network parses the label stack and compares information in the label stack to entries in a table that indicates labels for the router and adjacencies to neighbor routers. If the label stack indicates that the receiving router is the egress router for the multicast flow, the router removes the label stack and forwards the packet to a multicast overlay such as a virtual private network (VPN) or other application that is using the multicast flow. The router also forwards copies of the packet to one or more next hops shared by one or more of the unicast paths indicated by labels in the label stack. The packet copies have label stacks that include labels of the corresponding unicast paths. This process is repeated until the packet reaches all the egress routers of the multicast flow. Thus, an ingress router can build a stateless TE-MDT using the subset of unicast paths to egress routers of the TE-MDT. This approach does not require a centralized controller or assignment of labels to links. The number of labels in the label stack equals to the number of egress routers since each label represents one unicast path (e.g., a TE-LSP) to an egress router.

FIG. 1 is a block diagram of a communication system 100 that implements stateful multiprotocol label switching (MPLS) multicasting according to some embodiments. The communication system 100 includes an MPLS network 101 that is formed from interconnected routers 111-1, 111-2, 111-3, 111-4, 111-5, 111-6, 111-7, 111-8, which are collectively referred to herein as "the routers 111." The MPLS network 101 supports communication between a set of local area networks (LANs) 112-1, 112-2, 112-3, 112-4, which are collectively referred to herein as "the LANs 112." In the illustrated embodiment, the LANs 112 access the MPLS network 101 via corresponding routers 111-1, 111-2, 111-3, 111-4.

The MPLS network 101 supports multicasting of packets using stateful MPLS multicast techniques. The multicast pathways between ingress and egress routers are represented as multicast distribution tree (MDTs) that indicate the pathways and replication points between the ingress and egress routers. The MDTs are identified using identifiers formed by combining an identifier (S) of the ingress router and a unique identifier (T) assigned to the MDT by the ingress router. In some embodiments, the MPLS network 101 supports a first MDT that connects the ingress router 111-1 to the egress routers 111-3 and 111-4. The first MDT is identified by the tuple {S=111-1, T=T1} and indicates a path including the routers 111-1, 111-5, 111-7, 111-3, and 111-4. The MPLS network 101 supports a second MDT that connects the ingress router 111-1 to the egress routers 111-2 and 111-3. The second MDT is identified by the tuple {S=111-1, T=T2} and indicates a path including the routers 111-1, 111-5, 111-2, 111-7, and 111-3. The MPLS network 101 supports a third MDT that connects the ingress router 111-1 to the egress routers 111-2, 111-3, and 111-4. The third MDT is identified by the tuple {S=111-1, T=T3} and indicates a path including the routers 111-1, 111-5, 111-2, 111-7, 111-3, and 111-4.

The MDTs are configured using a protocol such as a label distribution protocol (LDP) or multicast label distribution protocol (mLDP) to define the paths between the ingress and egress routers. LDP is a protocol used to distribute labels in non-traffic-engineered applications. LDP allows the routers 111 to establish label switched paths (LSPs) through the MPLS network 101 by mapping network-layer routing information directly to LSPs. An LSP is defined by the set of labels from the ingress Label Switching Router (LSR) to the egress LSR, e.g., from the (ingress) router 111-1 to the (egress) router 111-4. LDP associates a Forwarding Equivalence Class (FEC) with each LSP it creates. An FEC is a collection of common actions associated with a class of packets. When an LSR assigns a label to an FEC, it lets other LSRs in the path know about the label. LDP helps to establish the LSP by providing a set of procedures that LSRs can use to distribute labels. The FEC associated with an LSP specifies which packets are mapped to that LSP. The LSPs are extended through the MPLS network 101 as each LSR splices incoming labels for an FEC to the outgoing label assigned to the next hop for the given FEC. The next hop for an FEC prefix is resolved in the routing table. LDP allows an LSR to request a label from a downstream LSR so it can bind the label to a specific FEC. The downstream LSR responds to the request from the upstream LSR by sending the requested label.

In the illustrated embodiment, the first MDT associated with the identifier (S=111-1, T=T1) is configured in the (source/ingress) router 111-1 and the egress routers 111-3, 111-4. Configuration of the first MDT triggers the egress routers 111-3 and 111-4 to initiate a join for the first MDT towards the router 111-7, which is the immediate next hop in the shortest path towards the router 111-1. As used herein, the term "join" refers to a label mapping message that includes a label assigned by a downstream router to an upstream router for a corresponding MDT identifier (S, T), e.g., the MDT identifier (S=111-1, T=T1) of the first MDT. Upstream routers in the first MDT send multicast data packets for the first MDT to downstream routers using the label advertised by the downstream router in the join message. The downstream router uses the label to identify the first MDT and forward the packet accordingly. On receipt of the join message, the router 111-7 installs state information for the first MDT in both the control plane and the data plane. The state information for the first MDT indicates that the routers 111-3 and 111-4 are downstream routers from the router 111-7. The router 111-7 also sends a join message to the router 111-5, which installs control and data plane states associated with the first MDT. The router 111-5 also sends a join message to the ingress router 111-1, which creates state information for the first MDT that indicates that the router 111-5 is the downstream router. Configuration according to LDP is then complete because the join message has reached the source/ingress router 111-1. Multicast packets that are multicast on the first MDT from the router 111-1 are replicated by transit routers along the established path of the first MDT so that copies of the packets are delivered to the egress routers 111-3 and 111-4. In some embodiments, the source of the multicast flow is an entity in the LAN 112-1.

In the illustrated embodiment, the LANs 112 function as the originator and recipient of packets on the MDTs supported by the MPLS network 101. However, in other embodiments, the MDTs supported by the MPLS network 101 are used by other applications such as virtual private network (VPN), virtual private LAN service (VPLS), border gateway protocol, ethernet VPN (BGP-EVPN), and the like for multicasting packets. Applications that use the MDTs for multicasting packets are referred to herein as portions of a "multicast flow overlay." For example, in the first MDT, the routers 111-1, 111-3, 111-4 could be Provider Edge (PE) routers providing IP based Virtual Private Network (VPN) service. The multicast flow overlay includes the protocols and procedures between 111-1, 111-3 and 111-4. The MVPN signaling enables an ingress PE router to determine a set of egress PE routers for a given multicast flow (or set of flows). In VPN, a PE router has a locally connected VPN site. The ingress PE router receives a packet from its local VPN site, looks up the packet in the "Virtual Routing and Forwarding Table" (VRF) of the VPN to identify the egress PE router for the packet. If the packet is to be multicast to a set of egress PE routers, then the ingress router sends the packet on the MDT that has the egress PE routers as leaves. The procedures also enable an egress PE router to determine the VRF to which a multicast packet received from the MDT should be forwarded.

The path from the source router to the egress router is the same for the MDTs that are configured using mLDP and include a common egress router. This is because the path is based on the shortest path from the egress router to the source. As a result, traffic from all MDTs to that egress router gets concentrated on a common path that is shared by the MDTs, which may lead to packet drops if the shared path is oversubscribed. The MDTs are therefore agnostic to quality-of-service (QoS) because the QoS of an application (overlay) traffic carried by an MDT may not be satisfied by the common path. Even though alternate paths may exist, those paths are not exercised. Thus, mLDP based MDTs are often referred to as "best-effort" (BE) MDTs. In some embodiments of an mLDP enabled network, the unicast LSPs are also set-up by LDP, which follows the shortest path (or best path) to the respective egress routers as computed by IP routing. A unicast LSP in LDP is therefore identified by an IP Prefix that identifies an egress router or a destination route. As a result, there could be only one unicast LSP to an egress router and LDP based unicast LSPs are BE-LSPs as well.

The Resource Reservation Protocol (RSVP) is a network control protocol used by a host to request a QoS from the MPLS network 101 for application data streams or flows. RSVP is also used by routers 111 to deliver QoS requests to nodes along the path(s) of the flows and to establish and maintain state to provide the requested service. An extension of RSVP (RSVP-TE) is used to configure traffic engineered (TE) unicast LSPs from an ingress router to an egress router, which means that an LSP is set-up along a path that satisfies a given QoS criteria. Typically, RSVP-TE computes a path that satisfies a given QoS constraint by executing CSPF (Constraint Shortest Path First) algorithm on TEDB (Traffic Engineering Data Base). A TEDB contains the static and dynamic TE metrics of the links in the MPLS network 101 such as configured bandwidth, available bandwidth, delay, latency, color, affinity, and the like. In some embodiments, the routers 111 build identical copies of the TEDB from the TE information of the links flooded by the routing protocols. Once a path is computed, the RSVP-TE signals the LSP from the ingress router along the path. The ingress router sends Path Messages along the LSP that reserves TE resources in the routers along the path. When egress router receives a Path message, it sends back a reservation (Resv) message to upstream router (along the path) that includes a label assigned to the LSP. Each router, on receipt of Resv from downstream router of an LSP, allocates a label and sends Resv message to its upstream with the label. When ingress router finally receives a Resv message from its downstream router of the LSP, the signaling of the TE-LSP is complete. There could be multiple TE-LSPs from an ingress router to an egress router, each satisfying a specific QoS criteria. So, a TE-LSP in RSVP-TE is identified by {ingress router, egress router, tunnel id} wherein tunnel id is the differentiator along the TE-LSPs between the pair of routers.

A point-to-multipoint extension of RSVP-TE (P2MP-RSVP-TE) is used to configure MDTs in the MPLS network 101. The MDTs in the MPLS network 101 that are configured using P2MP-RSVP-TE are traffic engineered, which means that the MDTs are set up along the paths to egress routers that satisfies a given QoS criteria. The signaling paradigm of P2MP RSVP-TE is source initiated. The source initiates signaling of an independent unicast TE-LSP to each egress router (e.g., the S2Ls), with a common P2MP attribute which acts as a binder among them, and can be considered as the unique identifier of the MDT from the ingress router. Path messages are sent for each S2L along its computed path. When Resv messages of S2Ls are propagated back from respective egress routers and reach a common branch router, then the common P2MP attribute on S2Ls make them branches of the same P2MP TE-LSP (the traffic engineered MDT). In some embodiments, ingress router 111-1 configured three S2Ls to 111-2, 111-3 and 111-4, respectively. Each S2L follows the computed path based on QoS criteria.

Some embodiments of the MPLS network 101 implement stateless multicast using the MPLS data plane without needing to implement per-MDT specific control plane and data plane states as required in stateful MPLS multicast. When a multicast data packet enters a stateless MPLS multicast domain (e.g., the MPLS network 101), the ingress router (e.g., the router 111-1) determines the set of egress routers to which the packet needs to be sent. The ingress router then encapsulates the packet in an MPLS label stack. Each label in the stack represents exactly one egress router in the domain. Thus, all egress routers for the multicast packet are encoded into the packet itself. The label stack is referred to herein as an "Explicit Multicast Label Stack" (EMLS). In some embodiments, the egress router is encoded in the EMLS using the label of a unicast BE-LSP to the egress router because a BE-LSP is uniquely identified by a loopback IP address configured in the egress router. Consequently, a unicast BE-LSP exists from the ingress router to each egress router of the multicast flow. The EMLS packet is forwarded using the data plane states of the unicast BE-LSPs to the egress routers. Each router along the way parses the EMLS packet, partitions the egress routers based on the next hop of their unicast BE-LSPs, and forwards an appropriate EMLS packet to each of the next-hops. An egress router removes the EMLS and forwards the packet in the context of the multicast flow overlay. Thus, both multicast and unicast packets are sent to the egress routers using the common MPLS data plane states.

To configure or set up the BE-LSP, an egress router assigns a label to its loopback address from its local label space (e.g., a platform-wide label space) and the label mapping is distributed throughout the MPLS network 101 using the MPLS control plane. A router that receives the label mapping(s) computes an SPF to the loopback address and accordingly sets up the forwarding states of the LSP. For example, a label assigned to a loopback address of a router can be advertised as Label Mapping to a Prefix FEC. If the MPLS network 101 supports Segment Routing (SR), then the label mapping can be distributed using the SR control plane that supports IS-IS, OSPF, OSPFv3, BGP-LS, and the like. For example, the SR control plane can advertise such label mapping as Prefix Segment Identifiers (SID). In an MPLS network 101 enabled with LDP or SR, unicast BE-LSPs exist between an ingress router to all possible egress routers in the domain of the MPLS network 101. Thus, stateless multicast of EMLS packets does not incur any additional control plane or data plane overhead and is a simple turn-key solution on MPLS deployments of unicast BE-LSPs.

The size of an EMLS grows linearly with the number of egress routers, so stateless MPLS multicasting can be scaled to multicast to a large number receivers using a quasi-stateful approach. In the quasi-stateful approach, stateless MPLS multicasting is not limited to narrowcast applications and can be used in scenarios such as IP-TLV deployments that involve many receivers (e.g., home subscribers). The quasi-stateful approach builds a hierarchy in which the ingress router multicasts a packet to a set of intermediate gateways. Each gateway acts as an ingress router for a subset of egress routers (or gateways for another hierarchy). A gateway is programmed with a "Tree Label", which translates to the EMLS for the subset of egress routers (or gateways for next level of hierarchy). An ingress router encodes the tuple {Tree Label, Gateway Label} in the EMLS that represents a gateway to which the multicast packet is sent. The Gateway Label is the label of the unicast BE-LSP to the gateway router. This tuple is referred to as a Tree Label Stack (TLS). A router receiving a TLS in an EMLS packet makes a forwarding decision based on the Gateway Label in the TLS. When a receiving router finds a TLS in an EMLS packet and its Gateway Label identifies the receiving router, then the receiving router removes the EMLS and translates the Tree Label to the EMLS containing the subset of egress routers (or gateways for next level hierarchy). The translated EMLS is pushed onto the packet and the packet is forwarded based on the EMLS. This approach is called "quasi-stateful" because a gateway is programmed with the state for a Tree Label that translates to the EMLS of a subset of routers. However, the state is not flow specific (so it is not stateful) and the Tree Label may be used for all the multicast flows that share the subset of egress routers (or gateways for next level hierarchy). At any point during the flight of an EMLS packet, the EMLS encodes the receivers in the current hierarchy, thereby reducing the size of the EMLS as well as processing overhead at the transit routers.

In the MPLS network 101, the loopback address X indicates the router 111-X which is assigned a label LX. For example, the router 111-1 has a loopback address of "1" and a label L1. The label mapping is advertised throughout the MPLS network 101 using the MPLS control plane. In the illustrated embodiment, a unicast LSP exists from the (ingress) router 111-1 to each of the (egress) routers 111-2, 111-3, 111-4. In this example the same label LX is used to identify the egress router X across the MPLS network 101, but in practice each router 111 would allocate a label from its own local label space to identify unicast LSP X.

When the router 111-1 wants to multicast a packet to egress routers 111-2, 111-3, 111-4, the router 111-1 looks up labels of BE-LSPs to the egress routers 111-2, 111-3, 111-4 in its FTN Table, which results in labels L2, L3, L4, respectively. The next hop from the router 111-1 for these labels is the router 111-5, which is the common shortest path to reach corresponding egress routers 111-2, 111-3, 111-4. An EMLS packet is generated with label stack={L2, L3, L4} and the packet is sent to the router 111-5. When the router 111-5 receives the EMLS packet, it needs to process the EMLS to make forwarding decisions. The processing that a router does on receiving an EMLS packet is as follows:

Perform a lookup in the incoming label map (ILM) Table to determine the next hop and label for each of the labels listed in the EMLS.

If ILM entry for a label indicates that this is the egress router for the packet, then the label is removed from the EMLS and a local copy of the packet is sent to the upper layer. If not, an egress router then proceeds to next step.

Partition the labels based on their next hops.

Replicate the packet so that there is one copy of the EMLS packet for each of the next hops found in previous steps.

Modify the EMLS in each of the copies so that the label stack in the copy for a given next hop includes just the labels that ought to be switched to that next hop.

Send the modified copies of the EMLS packet to the next hops.

If there is only one label for a next hop, then as an optimization the router can send the packet as a standard unicast MPLS packet with that label as there is no gain by formatting as EMLS packet.

When the router 111-5 receives a packet with EMLS={L2, L3, L4}, the router 111-5 performs the above algorithm to replicate the packet into two copies, based on the shortest path of the unicast LSPs. The two copies are defined as follows:

Copy1 with EMLS={L2} is sent to the router 111-2. Since there is single label, the packet can be sent as a regular unicast packet with label L2.

Copy2 with EMLS={L3, L4} is sent to the router 111-7.

The routers 111-2 and 111-7 follow a similar procedure and eventually the packet is delivered to the egress routers 111-2, 111-3, 111-4. Note that when the topology of the MPLS network 101 changes, the unicast BE-LSPs to the egress routers adapt to the new topology. The forwarding paths of EMLS packet for a flow adapt automatically because the path the EMLS packet would take to a given egress router follows the unicast BE-LSP to that egress router.

Figure 2:
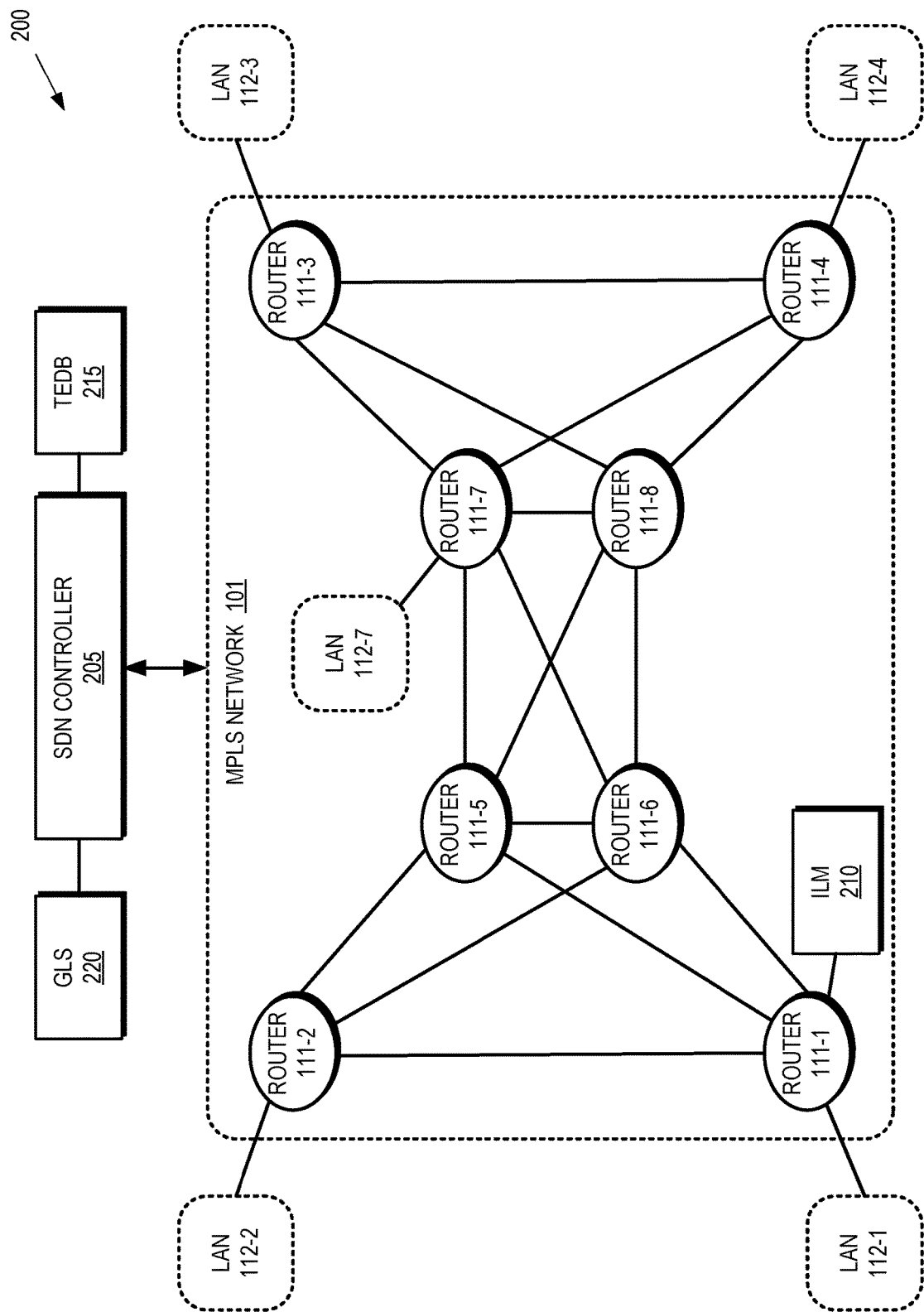
FIG. 2 is a block diagram of a communication system that implements stateful MPLS multicasting along traffic engineered (TE) paths according to some embodiments.

FIG. 2 is a block diagram of a communication system 200 that implements stateful MPLS multicasting along traffic engineered (TE) paths according to some embodiments. The communication system 200 includes the MPLS network 101 that is formed from the routers 111-1, 111-2, 111-3, 111-4, 111-5, 111-6, 111-7, 111-8, which are collectively referred to herein as "the routers 111." The MPLS network 101 supports communication between a set of LANs 112-1, 112-2, 112-3, 112-4, which are collectively referred to herein as "the LANs 112." The communication system 200 differs from the communication system 100 shown in FIG. 1 because the communication system 200 includes a software defined networking (SDN) controller 205 that supports traffic engineering. The communication system 200 also includes a LAN 112-7 that is connected to the router 111-7.

The routers 111 participate in stateless MPLS multicast delivery with TE. The routers 111 are also referred to as R1-R8. Labels are assigned to the following network elements in network 100.

Each router is assigned a label, which identifies itself in the domain of the MPLS network 101. This label is referred to as a "node label." For example, each of the routers R1-R8 are assigned a node label.

Each adjacency between the routers 111 is assigned two labels, one for each direction. For example, adjacency between R5 and R7 has two directions —R5→R7 and R7->R5, so each is assigned a label. Each direction of the adjacency itself is referred to as the "adjacency." The label assigned to an adjacency is referred to herein as an "adjacency label."

The routers 111 program the following labels into their ILM Table (such as the ILM table 210 associated with the router 111-1):

Its assigned node label is programmed with the forwarding context as "self"

Adjacency label for each adjacency that is "forward connected," i.e., the direction is from the router to the neighbor. An adjacency label is programmed with the forwarding context as the adjacency to the neighbor.

When a QoS aware multicast flow is configured in an ingress router to a set of egress routers, the ingress router sends an explicit path tree computation request to a Path Computation Element (PCE) that is implemented in the SDN controller 205. The computation request includes one or more QoS parameters (e.g., bandwidth, delay, color etc). The PCE could be also hosted by a Network Management Entity (NME) or other entity, which are collectively referred to herein as "SDN Controllers." The PCE maintains a centralized TE database (TEDB) 215 of all the links in the network. The TEDB 215 contains the TE metrics of all links such as configured bandwidth, available bandwidth (i.e., the configured bandwidth−total bandwidth reserved by existing flows), delay, color, preference, and the like. Upon receiving the request from the ingress router, the SDN controller 205 computes an explicit path tree that would meet the requested QoS and updates the dynamic TE metrics (e.g., available bandwidth) on the links in the tree by reserving the QoS resources required by the flow. The SDN controller 205 responds to the ingress router with the explicit path tree as the set of adjacencies that form the tree.

When an ingress router needs to send a packet for the multicast flow, it pushes an MPLS label stack onto the packet. The label stack includes the node labels of the egress routers and the adjacency labels for the adjacencies that form the explicit path tree. The label stack is referred to herein as a "Traffic Engineered Explicit Multicast Label Stack" (EMLS-TE). When a router receives the packet, it inspects the labels in EMLS-TE for its own node label or forward connected adjacency labels. If the router finds its own node label then it is the egress router of the MPLS packet, so it removes the EMLS-TE and forwards the packet further based on its native header. If it finds forward connected adjacency labels, then it removes those labels from the EMLS-TE and forwards a copy of the packet to each adjacency. Following this method of forwarding, each egress router receives a copy of the packet. The packet strictly follows the explicit path tree.

However, encoding and forwarding based on the EMLS-TE has a fundamental flaw. In MPLS, each router allocates labels from its local label space (also known as "per-platform label space"). Consequently, a label is only unique to a specific router. Each router allocates its node label and the forward connected adjacency labels from its local label space. As a result, node labels or forward connected adjacency labels allocated by two different routers may overlap and lead to overlapping of labels in EMLS-TE. When a router makes a forwarding decision based on the EMLS-TE, the overlapping labels result in incorrect forwarding behavior.

To fix the problem of overlapping labels in EMLS-TE, labels can be allocated from a global label space (GLS) 220. The global label space 220 is a network wide unique label space. In the illustrated embodiment, the SDN controller 205 centrally manages and allocates the labels in the global label space 220. For example, the SDN controller 205 assigns globally unique labels from the global label space 220 for the following network elements in the MPLS network 101:

Each router 111 is assigned a global label, which uniquely identifies itself in the domain. A global label assigned to identify a router 111 is referred to as "node global label".

Each adjacency between the routers 111 is assigned a global label. A global label assigned to identify an adjacency is referred to as "adjacency global label".

The routers 111 maintain "global ILM Tables" (or G-ILM) in the MPLS data plane. A label allocated from global label space 220 is programmed to map the label to its appropriate forwarding context. A G-ILM entry encodes the forwarding context in a NHLFE (Next-Hop Label Forwarding Entry), that contains directives to forward the packet. The G-ILM in a router 111 is in addition to the "default" ILM Table of state-of-the-art MPLS data plane. The labels allocated from local label space of the router 111 for other MPLS based applications continue to be programmed in the default ILM Table.

The SDN controller 205 programs the G-ILM in each router 111 in the domain with the following labels.

The node global label of the router is programmed with the forwarding context as "local" or the "self".

Adjacency global label for each adjacency that is "forward connected" i.e., direction is from the router to the neighbour. An adjacency global label is programmed with the forwarding context as the adjacency to the neighbour.

Assigning globally unique labels from the global label space 220 ensures that there is no overlapping of any node or adjacency labels across the stateless MPLS multicast TE domain (e.g., the MPLS network 101), since their assigned global labels are unique across the domain.

When an ingress router needs to send a packet for the multicast flow, it pushes an MPLS label stack onto the packet. The label stack includes the node global labels of all egress routers and the adjacency global labels for the adjacencies that form the explicit path tree. The global labels can be encoded within EMLS-TE in any random order. A packet encoded with EMLS-TE is denoted as EMLS-TE packet. The ingress router performs the following operations to forward the packet along the tree.

1) Looks up each global label in the EMLS-TE in its G-ILM, to identify the labels that indicate its forward connected adjacencies.

2) For the identified adjacencies, it removes corresponding global labels from the EMLS-TE.

3) For each forward connected adjacency, the ingress router makes a copy of the EMLS-TE packet and sends the packet to the next-hop of the adjacency.

A router 111 that receives an EMLS-TE packet performs the same operations as described above with an additional step:

4) If a global label looked up in step 1 indicates the router itself, then it makes a local copy of the packet, removes EMLS-TE from the copy and forwards the resultant copy of the packet based to the multicast flow overlay on its native headers.

The packet therefore gets replicated along the tree and eventually a copy is received by each egress router. Note that the copy received by an egress router may contain labels in the EMLS-TE that have no context in its G-ILM; such labels identify adjacencies along a branch of the tree which is not traversed by this copy.

In some embodiments, stateless MPLS multicasting over TE paths is used to encode node and adjacency labels in EMLS-TE by using local label spaces. Each router 111 in the stateless MIMS multicast TE domain is assigned a network-wide unique integer index. The network wide unique router index space is centrally managed by the SDN controller 205. In some embodiments, the router Rx is assigned the index x. For example, the router R5 is assigned index 5.

Labels are allocated to identify the following network elements:

a) Each router is allocated a node label from its local label space. In an IP network, the node label may map to a routable loopback IP address in the router.

b) Each adjacency is assigned an adjacency label from the local label space of the router, for which the adjacency is forwarded connected. For example, for the adjacency R5->R7, the label is allocated from the local label space of R5.

Each router programs the following labels into its ILM Table 210:

c) Its assigned node label is programmed with the forwarding context as "self".

d) Adjacency label for each adjacency that is "forward connected" i.e., direction is from the router to the neighbour. An adjacency label is programmed with the forwarding context as the adjacency to the neighbour.

As discussed herein, since node and adjacency labels are allocated from local label spaces of their parent routers, encoding the explicit path tree onto a packet as the MPLS label stack containing node and adjacency labels along the tree leads to overlapping of labels in the label stack. As a result, a forwarding router of the packet cannot uniquely identify the labels of its node or forward connected adjacencies in the tree to make a forwarding decision. Some embodiments therefore encode the explicit path tree in a MPLS label stack that enables a forwarding router to uniquely identify its node and forward connected adjacency labels in the tree.

In this approach, a node or adjacency in the explicit path tree is uniquely identified across the domain as the tuple {router index, label}, where "router index" in the tuple is the router index assigned to the parent router of the node or adjacency and the "label" in the tuple is the label assigned to a node or adjacency from the local label space of the parent router. This tuple is referred to herein as an "indexed label." A node or adjacency is uniquely identified in the domain with its indexed label; the router index acts as the distinguisher between overlapping labels. An explicit path tree can be represented as the set of indexed labels of nodes and adjacencies along the tree. The router index can be also considered as the domain wide unique identifier of the local label space in the router. The indexed label would represent a label along with the identifier of the local label space from which the label is allocated. An indexed label can be encoded in EMLS-TE as a stack of two MPLS labels (i.e., router index is also encoded as a MPLS Label). Encoding the explicit path tree into EMLS-TE as the stack of indexed labels of node or adjacencies in the tree is not very efficient, since the indexed labels of node and/or forward connected adjacencies in a router along the tree bear the same router index.

Instead, some embodiments of the routers 111 encode indexed labels into EMLS-TE. An explicit path tree is encoded in the EMLS-TE as tuples of {router index, router label block}, where the "router index" is the index assigned to a router that owns the "router label block," and the "router label block" is a block of labels containing the node label or the forward connected adjacency labels in that router along the tree. The explicit path tree can therefore be viewed as a set of routers along the tree and each router is specified with its node or adjacency label in the tree. The tuple {router index, router label block} is encoded as a label stack (i.e., router index is also encoded as MPLS Label) and is referred to herein as an "Indexed Label Block" (ILB). The labels within an ILB's router label block never overlap as those are assigned from local label space of the associated router, whereas the labels may overlap among different ILBs. The router index acts as the distinguisher between overlapping labels.

When an ingress router needs to send a packet for a multicast flow along an explicit path tree, it pushes EMLS-TE onto the packet. The EMLS-TE includes the ILBs of all routers along the explicit path tree. The ingress router performs the following operations to forward the packet along the tree:

1) Looks up the specific ILB that matches router index configured in the router.

2) For the matching ILB, it looks up each label in the ILB's router label block in its ILM to identify the labels that indicate its forward connected adjacencies.

3) It removes the ILB from the EMLS-TE.

4) For each forward connected adjacency, the ingress router makes a copy of the EMLS-TE packet and sends to the next-hop of the adjacency.

A router that receives an EMLS-TE packet performs the same set of operations 1-4, but with an additional step 5:

5) If a label looked up in step 2 indicates the router itself (i.e the label is the node label), then it makes a local copy of the packet, removes EMLS-TE from the copy and forwards the resultant copy of the packet based on its native headers.

However, there are several drawbacks to the MPLS multicasting techniques with EMLS-TE as described above regarding FIG. 2. These techniques are complex and difficult to scale to larger network sizes or larger tree sizes because the adjacency and egress routers in the tree are explicitly encoded into the EMLS-TE.

Figure 3:
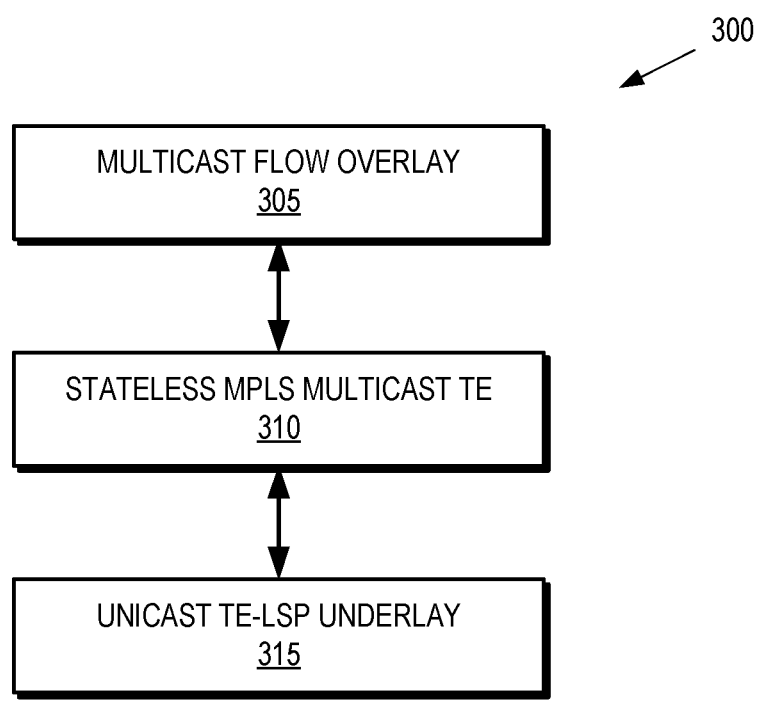
FIG. 3 is a block diagram illustrating a set of underlays and overlays for stateless MPLS multicasting with traffic engineering according to some embodiments.

FIG. 3 is a block diagram illustrating a set 300 of underlays and overlays for stateless MPLS multicasting with traffic engineering according to some embodiments. The set 300 includes a multicast flow overlay 305, a stateless MPLS multicast TE layer 310, and a unicast TE-LSP underlay 315. As discussed herein, the unicast packets are sent in RSVP-TE signalled TE-LSPs. An ingress router sends a packet on a TE-LSP based on the QoS requirements of the flow associated with the packet, such that the TE-LSP guarantees the required QoS. If the ingress router needs to multicast a packet to a set of egress routers while guaranteeing QoS of the associated flow, then the ingress router sends the packet on a subset of unicast TE-LSPs to the egress routers that guarantees the required QoS. The subset of unicast TE-LSPs form an underlay of the traffic engineered stateless explicit multicast tree, e.g., a Stateless MPLS Multicast TE.

The Stateless MPLS Multicast TE 310 uses a set of unicast TE-LSPs to the egress routers as an underlay for multicasting the packets to the egress router. When a multicast flow is set up by an ingress router to multicast packets to a set of egress routers, the ingress router first finds the matching TE-LSPs to the egress routers that would guarantee the QoS of the flow. If there are no TE-LSPs from ingress router to an egress router that meets the required QoS, the ingress router reoptimizes an existing TE-LSP or sets up a new TE-LSP to the egress router for the desired QoS, e.g., by executing CSPF on TEDB to compute the path that meets the QoS and RSVP-TE signals the TE-LSP along that path.

To send a packet for the multicast flow, the ingress router pushes an MPLS label stack (a type of EMLS-TE) onto the packet. The label stack includes the labels that identify the chosen set of unicast TE-LSPs to the egress routers. When a router receives the packet, it inspects the labels in EMLS-TE based on its ILM Table. If an ILM entry indicates that it is the egress router of a TE-LSP, then the router removes the EMLS-TE and sends the packet to multicast flow overlay 305, which forwards the packet further based on its native header. For the ILM entries that indicate the router is a transit router for TE-LSPs, the router sends a copy of the EMLS-TE packet to each next hop shared by a subset of TE-LSPs. The EMLS-TE carries the labels for the subset of TE-LSPs. Following this forwarding algorithm, each egress router receives a copy of the packet. The packet strictly follows the explicit path tree built on the paths along the unicast TE-LSPs.

Some embodiments of the techniques disclosed herein have the following advantages over conventional practice:

- Uses the unicast TE-LSPs for both unicast and multicast traffic, so it minimizes the control plane and data plane states in MPLS networks.
- No overhead in control plane and data plane as the existing unicast TE-LSPs are re-used as underlay.
- Eliminates the need to compute traffic-engineered explicit path tree.
- In the stateless MPLS multicast TE approach in FIG. 3, the size of EMLS-TE is proportional to the number of adjacencies and egress routers that form the explicit multicast tree. In contrast, the size of EMLS-TE is proportional to the number of egress routers of a multicast packet in some embodiments of the techniques disclosed herein, so the EMLS-TE overhead on a packet is reduced relative to the stateless MPLS multicast TE approach in FIG. 3.
- In the stateless MPLS multicast TE approach in FIG. 3, a receiving router also receives labels for which it does not have any states. For example, when an upstream router replicates an EMLS-TE packet to a first branch, then the EMLS-TE also includes the label stacks of the downstream routers in a second branch (and all other branches). So, when the receiving router is a downstream router in the first branch, the receiving router also receives the label stacks of the downstream routers of a second branch, for which the receiving router does not have any forwarding states. The presence of these irrelevant labels in the EMLS-TE packet increases processing overhead of the EMLS-TE packet at the receiving router, which adds to the overall latency of the EMLS-TE packets along the tree. In some embodiments of the routers disclosed herein, receiving routers only receive labels in the EMLS-TE that are associated with the forwarding states that exist in the router, e.g., the states of the unicast TE-LSPs to the subset of egress routers traversing this router, so the processing overhead and overall latency of EMLS-TE packets along the tree is reduced relative to the stateless MPLS multicast TE approach in FIG. 3.
- TE-LSPs have built in protection mechanisms and this approach does not require additional protection mechanism for failures along the path of the EMLS-TE packets.
- No limits on scalability since this approach does not require any TE-MDT like state maintenance in routers.
- Simple turn-key solution on existing RSVP-TE based deployments to add Stateless MPLS Multicast with TE or as an ideal replacement for existing P2MP-RSVP-TE based TE-MDTs.
- This approach does not use an SDN controller in some embodiments, so this approach offers a wider scope of deployments.

Figure 4:
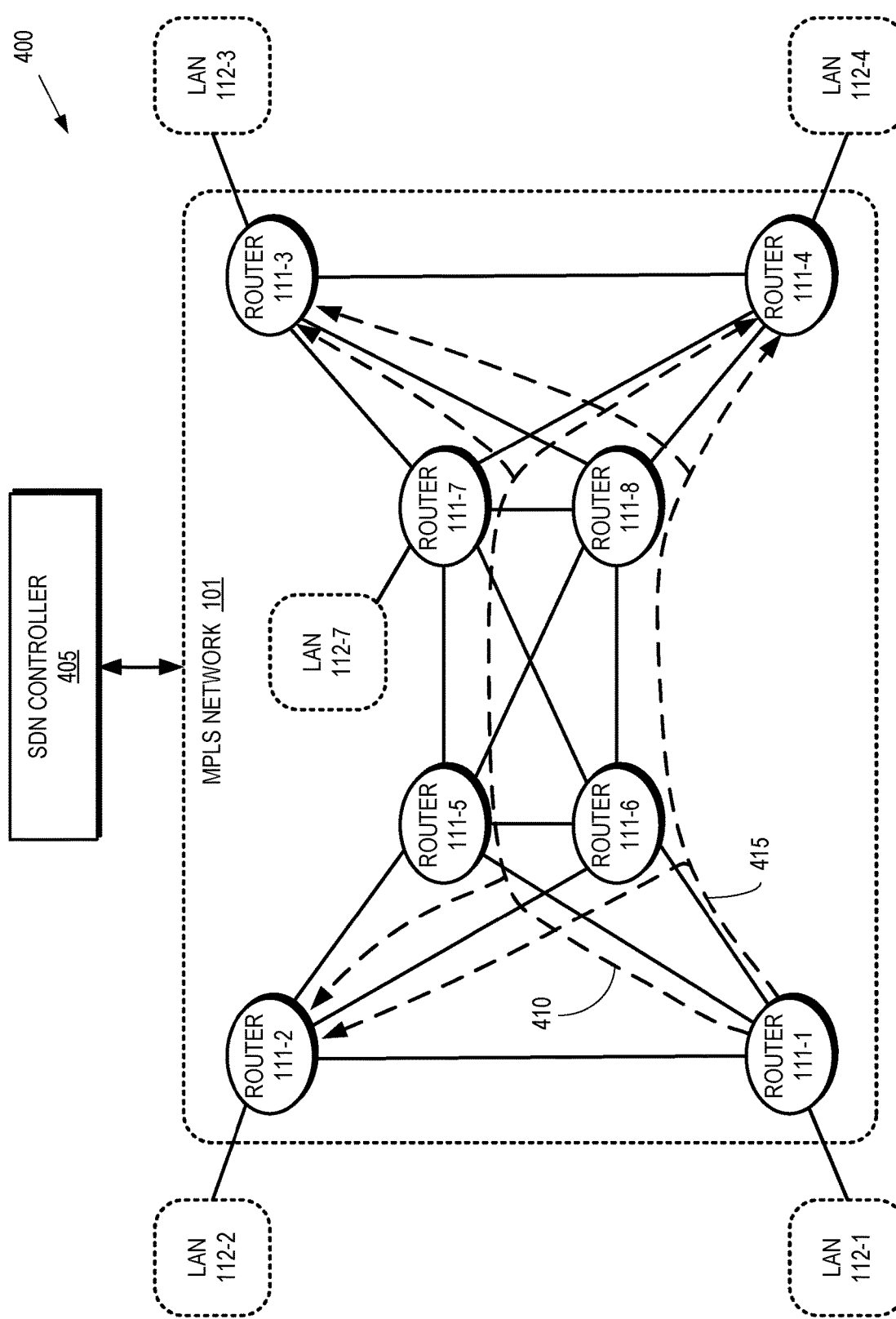
FIG. 4 is a block diagram of a communication system that implements stateless MPLS multicasting of two multicast flows over unicast TE paths according to some embodiments.

FIG. 4 is a block diagram of a communication system 400 that implements stateless MPLS multicasting of two multicast flows over unicast TE paths according to some embodiments. The communication system 400 includes the MPLS network 101 that is formed from the routers 111-1, 111-2, 111-3, 111-4, 111-5, 111-6, 111-7, 111-8, which are collectively referred to herein as "the routers 111." In the interest of clarity, the individual routers 111-X are sometimes referred to as "the router RX." For example, the router 111-1 is sometimes referred to herein as "R1." The MPLS network 101 supports communication between a set of LANs 112-1, 112-2, 112-3, 112-4, which are collectively referred to herein as "the LANs 112." Some embodiments of the communication system 400 include an SDN controller 405 that supports traffic engineering. Some embodiments of the communication system 400 also include a LAN 112-7 that is connected to the router 111-7.

The topology of the MPLS network 101 includes several unicast TE-LSPs from R1 to the egress routers R2, R3, R4, which are set up using a protocol to reserve, assign, or allocate resources of the MPLS network 101 based on traffic engineering. For example, RSVP-TE can be used as the signaling protocol to define and allocate resources to the unicast TE-LSPs. Extensions of LDP, such as constraint-based routing LDP (CR-LDP), could be another signaling protocol for define and allocate resources to the unicast TE-LSPs. In the interest of clarity, some embodiments are illustrated herein with RSVP-TE as the signaling protocol. In some embodiments, network elements such as the links between the routers 111 are assigned various TE metrics such as available bandwidth, delay, color, affinity, and the like. The values of the TE metrics of the links are flooded across the network using the Interior Gateway Protocols (IGPs) such as IS-IS, OSPF, etc. The routers 111 build identical copies of a TEDB for the MPLS network 101.

Setup of a TE-LSP is initiated by the source, which is R1 in the illustrated embodiment. At R1, a TE-LSP is assigned a specific set of QoS requirements such as bandwidth, delay, color, affinity, and the like. Then R1 computes a Constraint Shortest Path First (CSPF) on its TEDB to find an explicit path to the egress router that meets the QoS of the TE-LSP. Once an explicit path is computed, R1 sets up the TE-LSP along the path by using RSVP-TE, e.g., by sending path messages along the path in response to which Resv messages are sent back from the egress router along the reverse path. An Resv message includes label mapping for the TE-LSP from the downstream router. The state of the TE-LSP is maintained by RSVP-TE across each router 111 along its explicit path. RSVP-TE is a soft-state protocol, so it requires periodic refreshes of Path and Resv messages along the path of a TE-LSP to maintain its states. RSVP-TE uses the tuple {source router's IP address, destination router's IP address, tunnel ID} as the globally unique identifier of a TE-LSP and its states across the network. A tunnelID space used to allocate the tunnel IDs is specific to the source router. RSVP-TE messages also include the QoS attributes of the TE-LSP based on which the TE metrics on the links along the path are updated. In some embodiments, the available bandwidth on a traversed link before the TE-LSP is set up is 100 mbps. The bandwidth consumed by the TE-LSP is 20 mbps. Then after the TE-LSP is set up, the available bandwidth on the link is updated to 100−20=80 mbps. The updated TE metrics are then flooded by the IGPs, which get reflected in the TEDB of respective routers 111. In the interest of clarity, bandwidth is used as the QoS/TE metric in the following discussion. However, other QoS requirements or TE metrics are used instead of or in addition to the bandwidth values in some embodiments.

The MPLS network 101 can support multiple TE-LSPs from R1 to an egress router, each following a different explicit path and providing varying degrees of QoS/TE requirements (e.g., bandwidth, delay, cost, color, affinity, etc). In the illustrated embodiment, the identifier of a TE-LSP is identified with the mnemonic LSP_X_Y_N, where X=source IP address, Y=destination IP address, and N=tunnelID allocated by the source. The source and destination IP addresses are indicated by the name of the source and destination routers 111 respectively. For example, R1 is the IP address of router R1, R2 is the IP address of the router R2, etc. The label allocated by the router Ra for LSP_X_Y_N is represented as L_X_Y_N_Ra. For example, the label allocated by R5 for LSP_R1_R2_1 is advertised to R1 as L_R1_R2_1_R5.

The following tables 1-3 summarize the unicast TE-LSPs that are defined for the MPLS network 101 in the illustrated embodiment.

TABLE 1

R1 to R2

| LSP Identifier | Path | Signaled Bandwidth | Allocated Bandwidth | Residual Bandwidth |
| --- | --- | --- | --- | --- |
| LSP_R1_R2_1 | R1 -> R5 -> R2 | 100 | 20 | 80 |
| LSP_R1_R2_2 | R1 -> R6 -> R2 | 20 | 10 | 10 |
| LSP_R1_R2_3 | R1 -> R2 | 60 | 40 | 20 |

TABLE 2

R1 to R3

| LSP Identifier | Path | Signaled Bandwidth | Allocated Bandwidth | Residual Bandwidth |
| --- | --- | --- | --- | --- |
| LSP_R1_R3_1 | R1 -> R5 -> R7 -> R3 | 80 | 20 | 60 |
| LSP_R1_R3_2 | R1 -> R6 -> R8 -> R3 | 50 | 30 | 20 |
| LSP_R1_R3_3 | R1 -> R6 -> R7 -> R3 | 70 | 40 | 30 |

TABLE 3

R1 to R4

| LSP Identifier | Path | Signaled Bandwidth | Allocated Bandwidth | Residual Bandwidth |
| --- | --- | --- | --- | --- |
| LSP_R1_R4_1 | R1 -> R5 -> R7 -> R4 | 90 | 40 | 50 |
| LSP_R1_R4_2 | R1 -> R6 -> R8 -> R4 | 20 | 10 | 10 |
| LSP_R1_R4_3 | R1 -> R5 -> R8 -> R4 | 40 | 10 | 30 |

The TE-LSPs shown in tables 1-3 are used to carry unicast traffic from R1 to R2-R4 for various applications. At R1, which is the source of the TE-LSPs, the applications reserve TE resources within the TE-LSP. In the illustrated embodiment, the LSP_R1_R2_1 is set up with a bandwidth of 100 mbps, which is referred to herein as the "signaled bandwidth" of the TE-LSP across its path. Two applications are using the TE-LSP of the MPLS network 101 to send unicast traffic from R1 to R2. For example, an APP_R1_1 uses a bandwidth of 11 megabits per second (mbps) to send unicast traffic over the TE-LSP and an APP_R1_2 uses a bandwidth of 9 mbps to send unicast traffic over the TE-LSP. At R1, the total "allocated bandwidth" on the TE-LSP is 20 mbps and the "residual bandwidth" (i.e., the unallocated bandwidth) on the TE-LSP is 80 mbps, as shown in table 1.

Multicast flow 410 originates from LAN 112-1 and conveys packets to the receivers located in LANs 112-2, 112-3, 112-4. The multicast flow 410 requires a bandwidth of 40 mbps. Consequently, the router R1 selects one TE-LSP to each of R2-R4 that meets the bandwidth criteria (e.g., a TE-LSP that has residual bandwidth>=40 mbps). In the illustrated embodiment, the selected TE-LSP to R2-R4 are LSP_R1_R2_1, LSP_R1_R3_1, LSP_R1_R4_1, respectively. The router R1 accordingly adjusts the allocated and residual bandwidth of the three TE-LSPs by 40 mbps.

For each packet in the multicast flow 410, R1 pushes an EMLS-TE for the TE-LSPs={LSP_R1_R2_1, LSP_R1_R3_1, LSP_R1_R4_1}. To build the EMLS-TE, the router R1 looks up each TE-LSP in its FTN Table to find the next hop, the labels, etc, which results in EMLS-TE={L_R1_R2_1_R5, L_R1_R3_1_R5, L_R1_R4_1_R5} to the common next hop R1->R5. The EMLS-TE packet is sent by R1 on R1->R5.

Upon receiving the EMLS-TE packet, the router R5 looks up each label in its ILM Table. Based on the ILM Table lookup, it swaps incoming labels with the next hop labels.

Incoming label L_R1_R2_1_R5 is swapped with outgoing label L_R1_R2_1_R2 to next hop R5->R2.

Incoming label L_R1_R3_1_R5 is swapped with outgoing label L_R1_R3_1_R7 to next hop R5->R7.

Incoming label L_R1_R4_1_R5 is swapped with outgoing label L_R1_R4_1_R7 to next hop R5->R7.

Based on the next hops, R5 replicates the packet into the following two copies:

Copy-1: with EMLS-TE={L_R1_R2_1_R2} to next hop R5->R2. Since the EMLS-TE has only one label, some embodiments of the router R5 send the packet as unicast packet rather than as EMLS-TE packet, i.e., with just the label L_R1_R2_1_R2.

Copy-2: with EMLS-TE={L_R1_R3_1_R7, L_R1_R4_1_R7} to next hop R5->R7.

On receipt of Copy-1, R2 finds in its ILM Table that it is the egress router for label L_R1_R2_1_R2, so it removes the EMLS-TE (or the label if it was sent as unicast packet by R5) and forwards the packet to the multicast flow overlay.

On receipt of Copy-2, R7 looks up each label in its ILM Table. Based on the ILM Table lookup, it replicates the packet into the following two copies:

Copy-3: with EMLS-TE={L_R1_R3_1_R3} to next hop R7->R3. Since the EMLS-TE has only one label, some embodiments of the router R7 send the packet as unicast packet rather than as EMLS-TE packet, i.e., with just the label L_R1_R3_1_R3.

Copy-4: with EMLS-TE={L_R1_R4_1_R4} to next hop R7->R4. Since the EMLS-TE has only one label, some embodiments of the router R7 send the packet as unicast packet rather than as EMLS-TE packet, i.e., with just the label L_R1_R4_1_R4.

When Copy-3 is received by R3, it finds that it is the egress router for label L_R1_R3_1_R3, so it pops the label and forwards the packet to the multicast flow overlay.

When Copy-4 is received by R4, it finds that it is the egress router for label L_R1_R4_1_R4, so it pops the label and forwards the packet to the multicast flow overlay.

In the interest of clarity, the illustrated embodiment depicts a P2MP multicast flow 410 from R1 to R2-R4. However, some embodiments of the MPLS network 101 support a mesh of TE-LSPs among all routers R1-R8, or at least between the routers 111 that participate in multicast. Thus, any router 111 can send EMLS-TE packets to any subset of the participating routers using the appropriate TE-LSPs among them.

FIG. 5 is a traffic engineered explicit multicast label stack (EMLS-TE) 500 according to some embodiments. The EMLS-TE 500 encodes a stateless explicit path tree to be traversed by a packet. The EMLS-TE 500 provides type-specific fields to encode the TE-LSPs used as underlay for the stateless explicit path tree. When the EMLS-TE 500 is embedded within an MPLS label stack consisting of "other" labels, a receiving router must be able to distinguish unambiguously between the EMLS-TE and non-EMLS-TE labels. To accomplish this, the label immediately preceding an EMLS-TE 500 is a "EMLS-TE Indicator (EMLS-TEI)", where preceding means closer to the top of the label stack (farther from bottom of stack indication). The EMLS-TEI is a special label that is not used for any other purposes.

The EXP and TTL fields in the EMLS-TEI are set to values as required for the packet. The sending router and receiving router of the EMLS-TE packet 500 use the EXP field for mapping the packet to the appropriate forwarding class. The originating router of the EMLS-TE 500 may set the TTL to maximum depth of the explicit path tree, which is the number of hops in the unicast TE-LSP with the highest number of hops among the unicast TE-LSPs that form the explicit path tree. The originating router may also choose to set the TTL to a maximum value of 255. A receiving router decrements the TTL field by 1, while processing the EMLS-TE packet 500. If TTL value becomes 0 after decrement, then receiving router drops the packet. An S bit is set to 0 since subsequent labels in EMLS-TE 500 follows the EMLS-TEI.

The EMLS-TE Label Stack is the body of the EMLS-TE 500. The structure depends on the Type field in the EMLS-TE descriptor.

FIG. 6 is an EMLS-TE descriptor 600 according to some embodiments. The EMLS-TE descriptor 600 is used in some embodiments of the EMLS-TE 500 shown in FIG. 5. The EMLS-TE descriptor 600 follows the EMLS-TEI and includes information that describes the type of EMLS-TE and the size of the EMLS-TE. The EMLS-TE descriptor 600 does not carry a special fixed value. The value of the EMLS-TE descriptor 600 encodes the type of EMLS-TE and the number of subsequent labels in the EMLS-TE stack.

Some embodiments of the EMLS-TE descriptor 600 encode the following:

Type: This 3-bit field encodes the type of EMLS-TE, e.g., as reserved type 0x1 or reserved types 0x2 and 0x3 to accommodate the EMLS-TE used by stateless MPLS multicast TE approach illustrated in FIG. 3. The type 0x4=Uses the mnemonic EMLS-TE-4 for type 4, which is assigned for some embodiments, although other embodiments allocate other types.

Num Labels=17-bit field, value of which indicates the number of subsequent labels that belong to the EMLS-TE. If the value is 'N' then subsequent N labels (following the EMLS-TE descriptor) belong to the EMLS-TE. Some embodiments configure the maximum value of N to the EMLS_MAX, which is configured as a network wide constant. The value of EMLS_MAX is chosen based on the maximum label processing limits of routers in the network or based on a maximum number of egress routers that participate in a multicast flow or a combination of both the factors. Some embodiments of the network configure EMLS_MAX for security reasons, such that if a router receives an EMLS-TE packet with number of labels larger than EMLS_MAX, then the router drops the packet as a malformed packet.

Exp=Originator of the EMLS-TE packet must set this field to 0. Receiver should ignore the value of this field.

S=set to 0, because the label stack of the EMLS-TE follows

TTL=TTL of the EMLS-TE packet.

FIG. 7 is a label stack 700 for an EMLS-TE according to some embodiments. The label stack 700 includes the next-hop labels for the TE-LSPs used as underlay for the multicast packet. The labels may be organized in any order. In the illustrated embodiment, the label stack 700 consists of N labels of a corresponding number of TE-LSPs. The label value field is a 20-bit field that encodes a label assigned from the local label space, e.g., a platform-wide label space of the receiving router. For a label, EXP and TTL fields field may be set to 0. A router that processes the EMLS-TE packet looks up a label in the label stack 700 in its ILM Table to make forwarding decisions.

FIG. 8 is an EMLS-TE 800 that is pushed onto a packet to some embodiments. The EMLS-TE 800 includes values that correspond to the multicast flow 410 shown in FIG. 4. Thus, the EMLS-TE 800 has a value of {L_R1_R2_1_R5, L_R1_R3_1_R5, L_R1_R4_1_R5} that is pushed by ingress router R1 into a packet of the multicast flow 410 shown in FIG. 4. The Type field in EMLS-TE Descriptor is set to 0x4 to indicate the type as EMLS-TE-4. There are 3 labels in the Label Stack part, so Num Labels field in EMLS-TE Descriptor is set to 3. The S bit in all labels except the last label L_R1_R4_1_5 is set to 0, since those are not the last label in the stack. The S bit for L_R1_R4_1_5 is dependent on whether a non-EMLS-TE label follows the label L_R1_R4_1_5.

Figure 9:
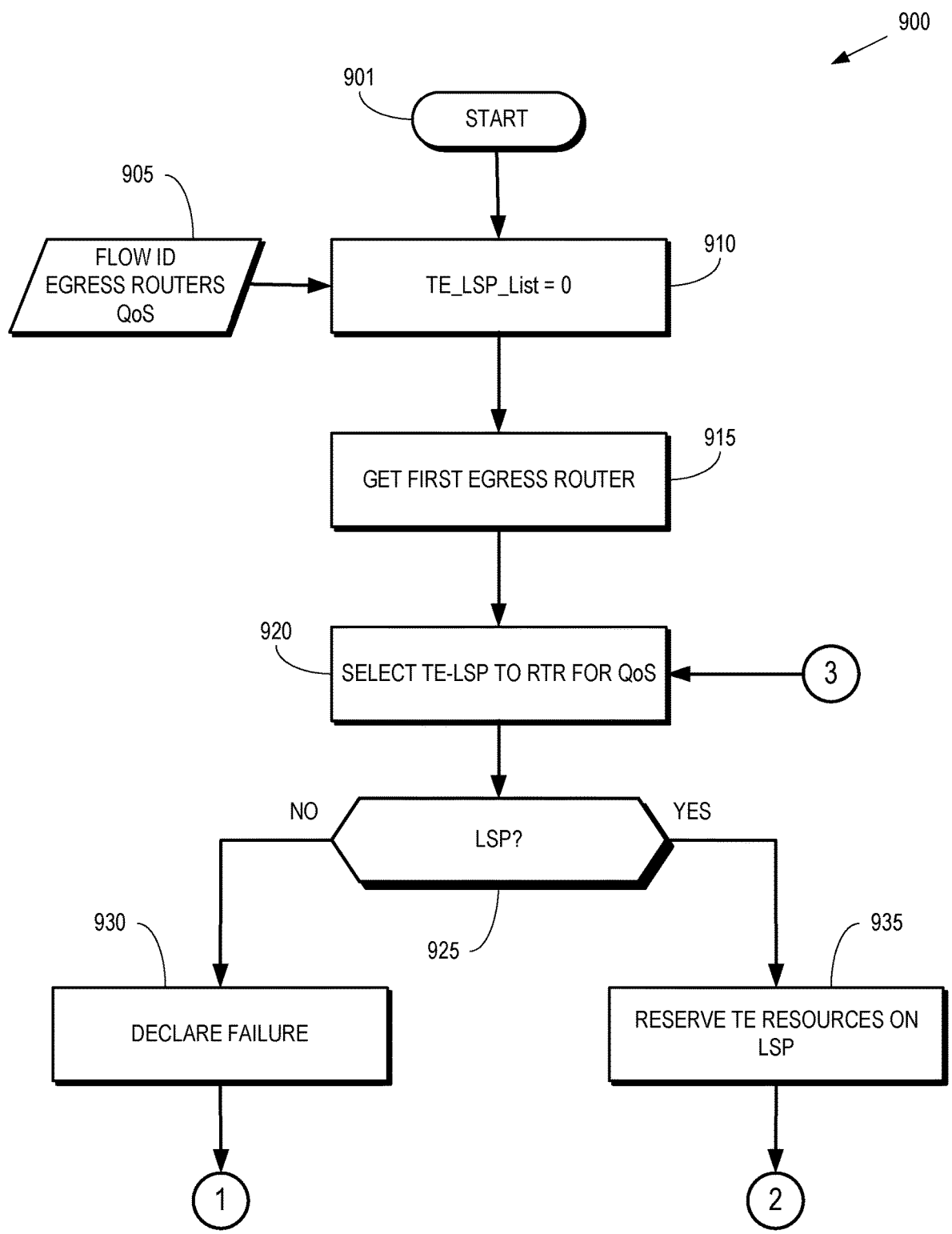
FIG. 9 is a flow diagram of a first portion of a method of configuring a multicast flow from an ingress router to a set of egress routers based on quality-of-service (QoS) requirements according to some embodiments.

FIG. 9 is a flow diagram of a first portion 900 of a method of configuring a multicast flow from an ingress router to a set of egress routers based on quality-of-service (QoS) requirements according to some embodiments. The ingress router selects the appropriate TE-LSPs to the egress routers that meet the QoS requirements of the multicast flow. The selected TE-LSPs are used as underlay for multicasting packets of the multicast flow to the egress routers. The method 900 is implemented in some embodiments of the (ingress) router 111-1 to configure the multicast flows 410, 415 shown in FIG. 4.

The method begins at the block 901. The input 905 to the method includes a flow identifier that uniquely identifies the multicast flow in the ingress router, a set of egress routers of the multicast flow, and one or more QoS requirements of the multicast flow. At block 910, the ingress router initializes an empty list of TE-LSPs. The list will eventually contain the set of TE-LSPs that reach the egress routers for the multicast flow and satisfies the specified QoS requirements.

At block 915, the ingress router retrieves the identity of the first egress router from the set of egress routers. At block 920, the ingress router selects the appropriate TE-LSP to the egress router, e.g., the TE-LSP that satisfies the QoS requirements for the multicast flow.

At decision block 925, the ingress router determines whether a matching TE-LSP has been found. If not, the method flows to the block 930 and the ingress router declares failure and performs the appropriate failure handling procedures. The block 930 is connected to the block 1005 in FIG. 10 via the node 1. If a matching TE-LSP is found, the method flows to the block 935.

At block 935, TE resources on the TE-LSP are reserved based on the QoS requirements of the flow. The block 935 is connected to the block 1010 in FIG. 10 via the node 2.

Figure 10:
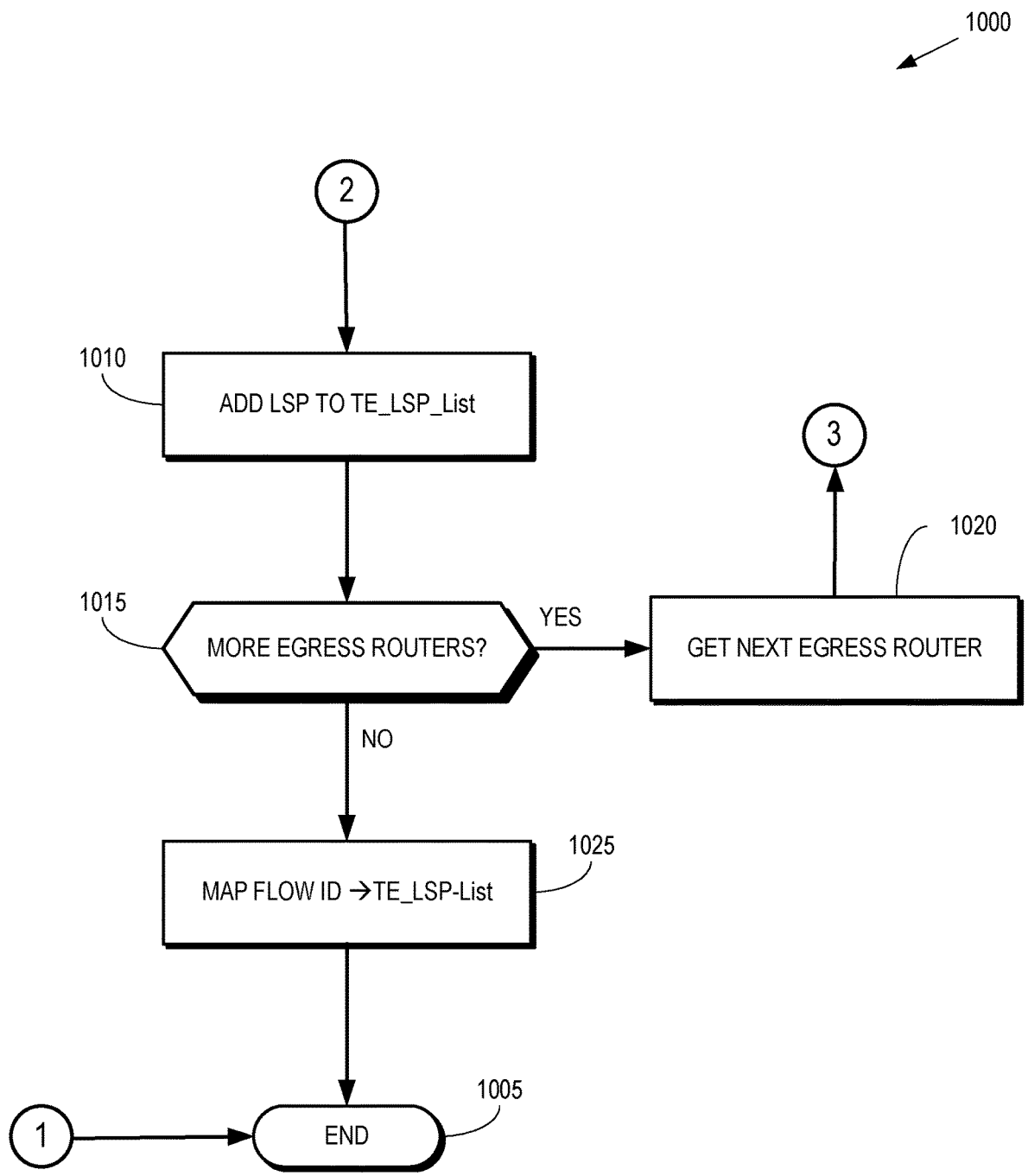
FIG. 10 is a flow diagram of a second portion of the method of configuring the multicast flow from the ingress router to the set of egress routers based on the QoS requirements according to some embodiments.

FIG. 10 is a flow diagram of a second portion 1000 of the method of configuring the multicast flow from the ingress router to the set of egress routers based on the QoS requirements according to some embodiments.

At block 1010, the TE-LSP is added to the list of TE-LSPs. At decision block 1015, the ingress router determines whether there are more egress routers in the input set of egress routers. If so, the method flows to the block 1020 and the next egress router is retrieved from the set of egress routers. The method then flows to the block 920 and FIG. 9 via the node 3. If there are no additional egress routers in the input set, the method flows to the block 1025.

At block 1025, the identifier of the multicast flow is mapped to the list of TE-LSPs that are selected to reach the egress routers in the input set. The method then flows to the block 1005 and the method ends.

Figure 11:
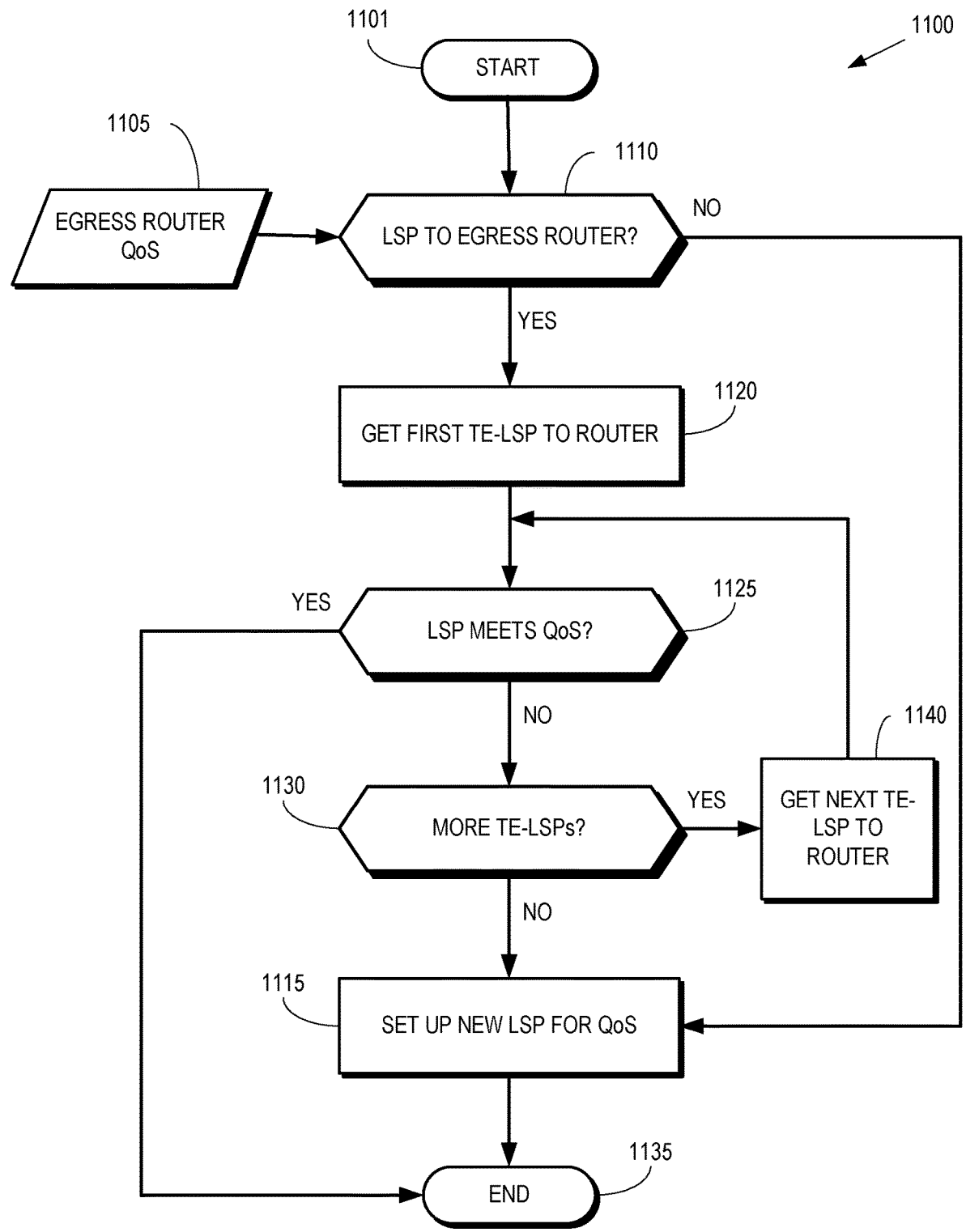
FIG. 11 is a flow diagram of a method of selecting an appropriate TE-LSP from an ingress router to an egress router according to some embodiments.

FIG. 11 is a flow diagram of a method 1100 of selecting an appropriate TE-LSP from an ingress router to an egress router according to some embodiments. The method 1100 is used to implement some embodiments of the block 920 shown in FIG. 9.

The method begins at the block 1101. The input 1105 to the method includes an identifier of the egress router associated with the TE-LSP and one or more QoS requirements of the multicast flow that are to be guaranteed by the selected TE-LSP.

At block 1110, the ingress determines whether there are any TE-LSPs to the egress router. If not, the method 1100 flows to the block 1115. If so, the method 1100 flows to the block 1120.

At block 1115, the ingress router configures and sets up a new TE-LSP to the egress router. The newly configured TE-LSP provide sufficient resources to meet the QoS requirements of the multicast flow.

At block 1120, the first TE-LSP to the egress router is retrieved. At decision block 1125, the ingress router determines whether the retrieved TE-LSP meets the QoS requirements of the multicast flow. If not, the method 1100 flows to the decision block 1130. If the retrieved TE-LSP meets the QoS requirements of the multicast flow, the method 1100 flows to the block 1135 and the method 1100 ends.

At decision block 1130, the ingress router determines whether there are additional TE-LSPs to the egress router. If so, the method 1100 flows to the block 1140 and the ingress router retrieves the next TE-LSP to the egress router. The method 1100 then flows back to the decision block 1125. If there are no additional TE-LSPs to the egress router, the method 1100 flows to the block 1115 and a new TE-LSP is configured. The method 1100 then ends at the block 1135.

Figure 12:
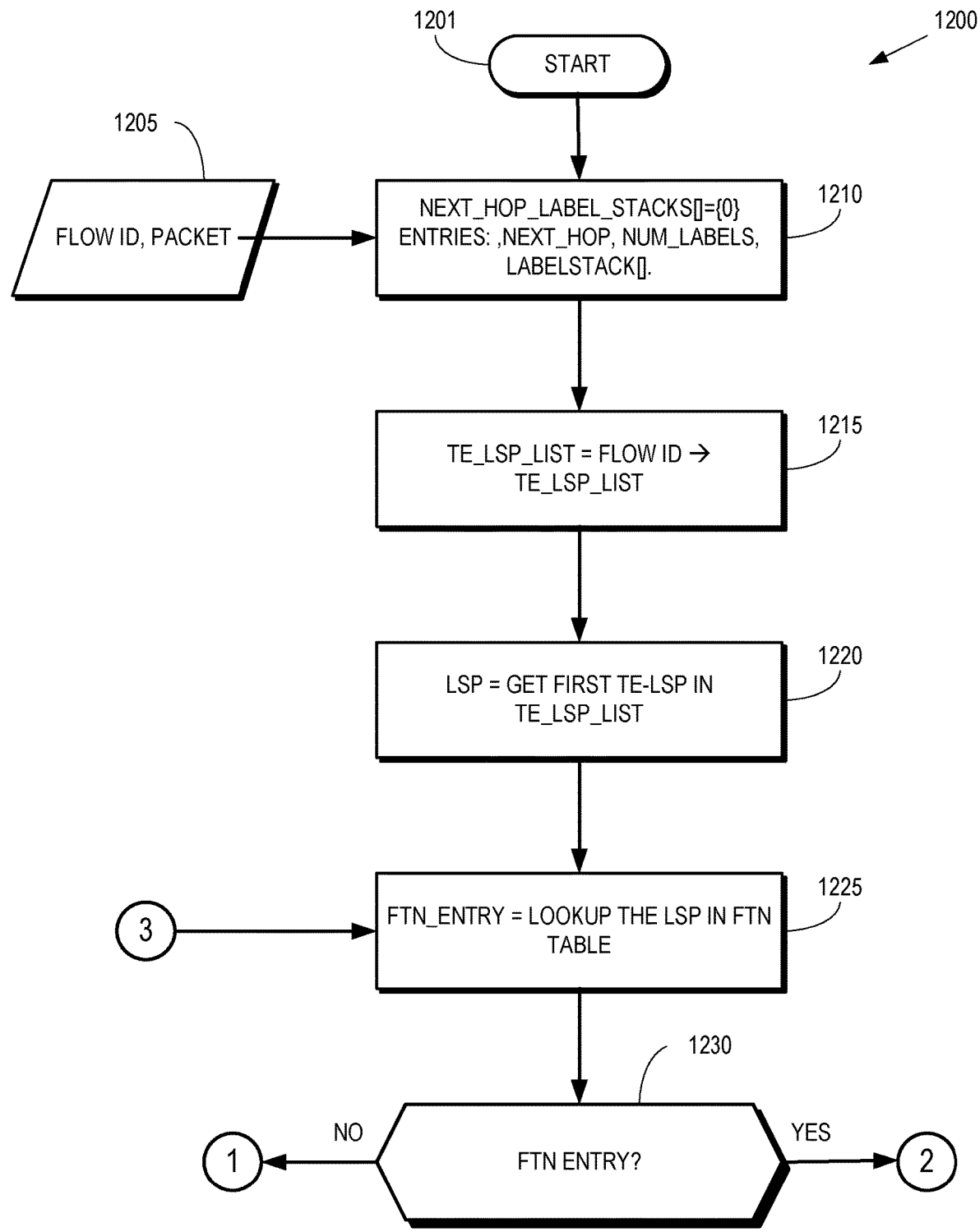
FIG. 12 is a flow diagram of a first portion of a method of originating EMLS-TE packets from an ingress router according to some embodiments.

FIG. 12 is a flow diagram of a first portion 1200 of a method of originating EMLS-TE packets from an ingress router according to some embodiments. The method is implemented in some embodiments of the (ingress) router 111-1 shown in FIG. 4.

The method begins at the block 1201. The input 1205 to the method includes a flow identifier that uniquely identifies the multicast flow in the ingress router and a packet to be multicast in the context of the multicast flow.

At block 1210, the ingress router initializes an empty Next_Hop_Label_Stacks[ ], which is a list of entries of type <NextHop, Num_Labels, LabelStack[ ]>. An entry contains the label stack of the TE-LSPs partitioned to a specific next hop.

At block 1215, the ingress router retrieves the list of TE-LSPs that are mapped to the flow identifier. The list includes the TE-LSPs that reach the egress routers at the multicast flow. At block 1220, the ingress router retrieves the first TE-LSP in the list. At block 1225, the ingress router looks up the TE-LSP in its FTN Table to determine the next hop and label information for the TE-LSP.

At decision block 1230, the ingress router determines whether an FTN for the TE-LSP is found in the table. If not, the method flows to the node 1, which connects to the block 1305 in FIG. 13. If an entry is found, the method flows to the node 2, which connects to the block 1310 in FIG. 13.

Figure 13:
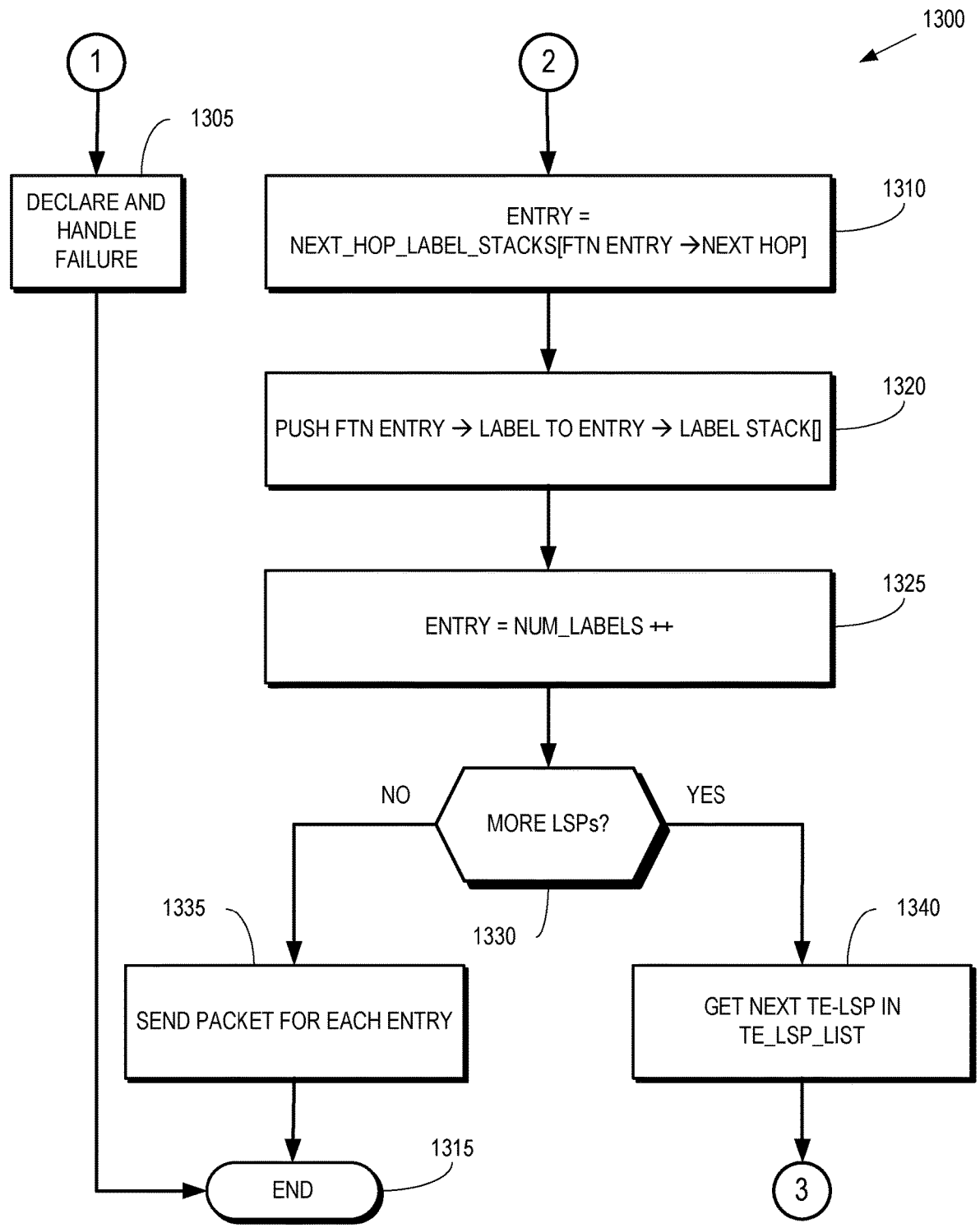
FIG. 13 is a flow diagram of a second portion of the method of originating EMLS-TE packets from the ingress router according to some embodiments.

FIG. 13 is a flow diagram of a second portion 1300 of the method of originating EMLS-TE packets from the ingress router according to some embodiments. The node 1 connects the block 1305 to the decision block 1230 shown in FIG. 12. The node 2 connects the block 1310 to the decision block 1230 shown in FIG. 12.

At block 1305, the ingress router declares and handles a failure to originate a packet and then flows to the block 1315, where the method ends.

At block 1310, the ingress router retrieves the entry in Next_Hop_Label_Stacks[ ] for the next-hop in the FTN entry. If entry does not exist, then an entry is created for the next hop. At block 1320, the ingress router pushes the next hop label of the FTN entry into the entry in Next_Hop_Label_Stacks[ ]. At block 1325, the ingress router increments the label count in the next hop's entry in Next_Hop_Label_Stacks [ ] because a label was pushed at block 1320.

At decision block 1330, the ingress router determines whether there are more TE-LSPs in the list of TE-LSPs of the flow. If so, the method flows to the block 1335. If not, the method flows to the block 1340.

At block 1335, packets are sent for each next-hop entry in Next_Hop_Label_Stacks[ ]. This point in the method is reached when the label stacks of all TE-LSPs are partitioned by their next hops in Next_Hop_Label_Stacks [ ]. In some embodiments, the ingress router sends an EMLS-TE-4 packet for each entry in Next_Hop_Label_Stacks [ ]. The method then flows to the block 1315 and the method ends.

At block 1340, the ingress router retrieves the next TE-LSP in the list. The method then flows to the block 1225 in FIG. 12 via the node 3.

Figure 14:
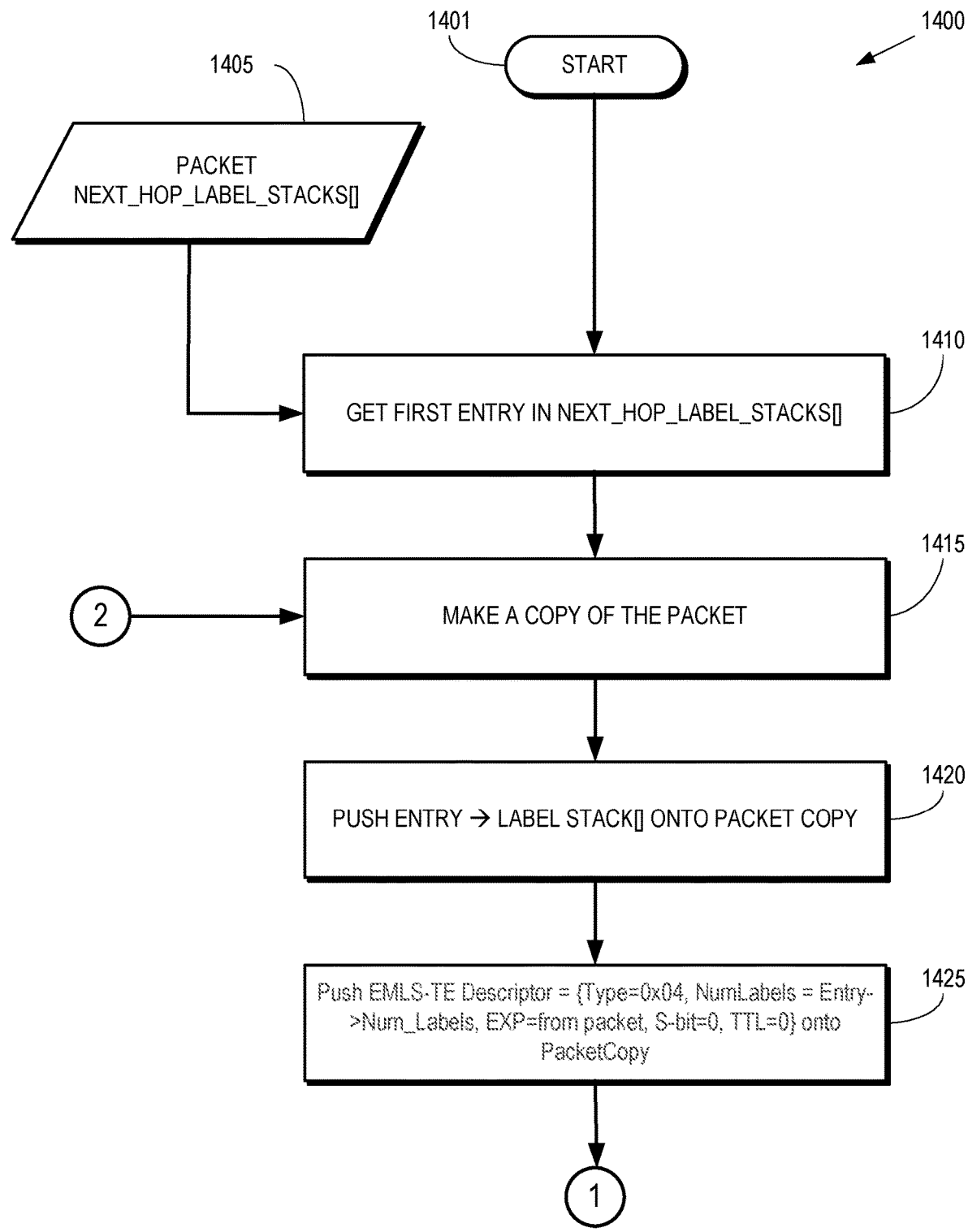
FIG. 14 is a flow diagram of a first portion of a method of sending EMLS-TE packets to next hop routers along a TE-LSP according to some embodiments.

FIG. 14 is a flow diagram of a first portion 1400 of a method of sending EMLS-TE packets to next hop routers in the explicit multicast tree according to some embodiments. The method is implemented in some embodiments of the block 1335 shown in FIG. 13.

The method begins at the block 1401. The input 1405 to the method includes a packet to be multicast in the context of the multicast flow and a list of label stacks partitioned per next hop, Next_Hop_Label_Stacks [ ].

At block 1410, the first entry in Next_Hop_Label_Stacks[ ] is retrieved. At block 1415, the router makes a copy of the packet. At block 1420, the router pushes the label stack of the entry in Next_Hop_Label_Stacks[ ] onto the packet copy.

At block 1425, the router pushes the EMLS descriptor with Type field set to 0x04 (to indicate EMLS-TE-4), NumLabels field set to value of Num_Labels of the entry in Next_Hop_Label_Stacks[ ], EXP as 0, S-bit as 0 and TTL as 0. The method then flows to the node 1, which connects the block 1425 with the block 1505 in FIG. 15.

Figure 15:
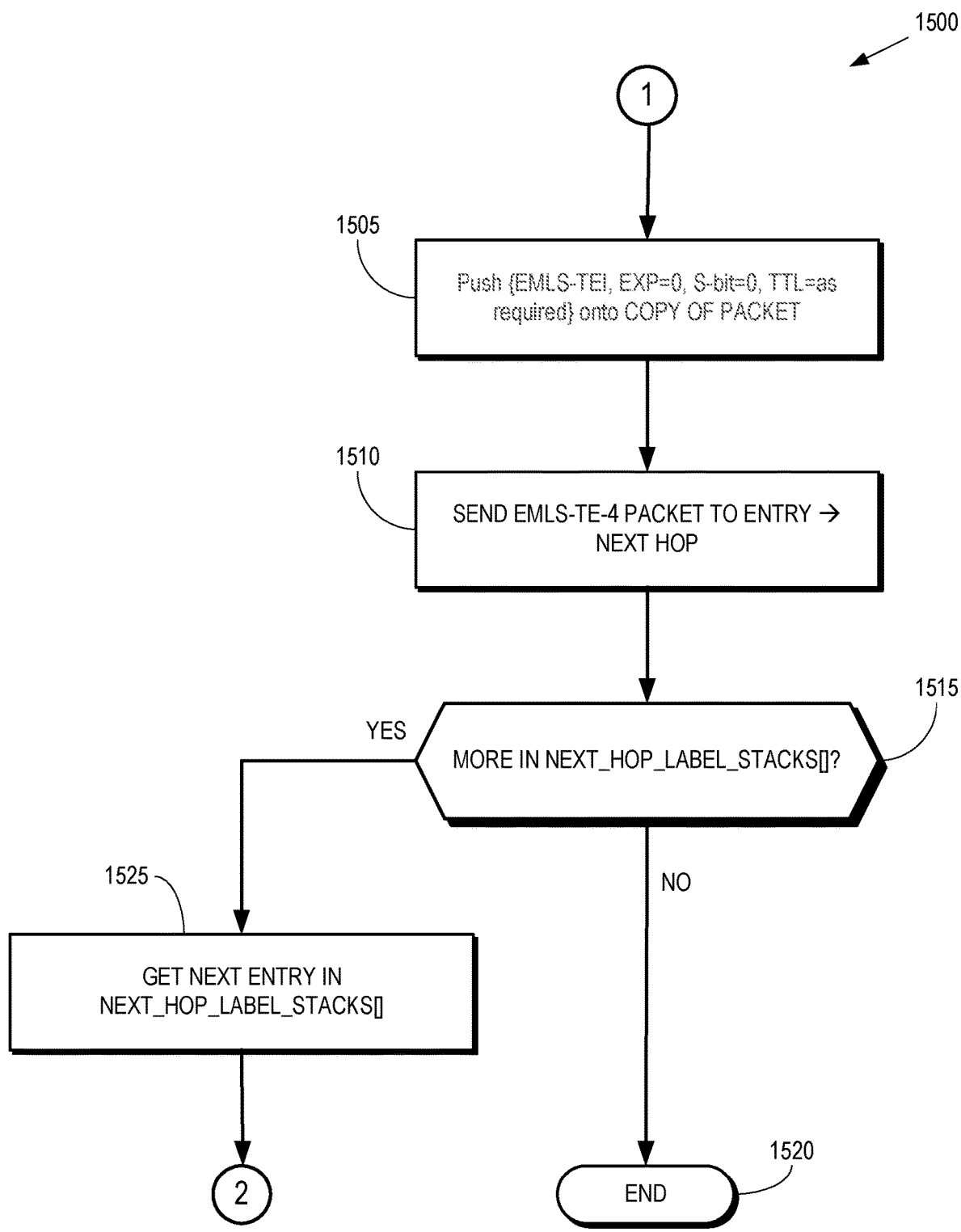
FIG. 15 is a flow diagram of a second portion of the method of sending EMLS-TE packets to next hop routers along a TE-LSP according to some embodiments.

FIG. 15 is a flow diagram of a second portion 1500 of the method of sending EMLS-TE packets to next hop routers along a TE-LSP according to some embodiments. The block 1505 connects to the block 1425 in FIG. 14 via the node 1.

At block 1505, the router pushes the EMLS-TEI into the label stack with S-bit as 0 and TTL. In some embodiments, the router sets the TTL to the maximum hops of a TE-LSP or the router sets the TTL to maximum value 255. The EXP may be set based on fields in the native header(s) of the packet copy. The label stack is now an EMLS-TE-4.

At block 1510, the router sends the EMLS-TE-4 packet to the next hop of the entry in Next_Hop_Label_Stacks[ ].

At decision block 1515, the router determines whether there are more entries in Next_Hop_Label_Stacks[ ]. If there are no more entries, the method flows to the block 1520 and the method ends. If there are additional entries, the method flows to the block 1525 and the router retrieves the next entry in Next_Hop_Label_Stacks[ ]. The method then flows to the node 2, which connects to the block 1415 in FIG. 14.

Some embodiments of the method shown in FIGS. 12 and 13 are executed for every packet to build the EMLS-TE-4 for each next-hop, which is not packet-specific and applies to any packets for the multicast flow. Some embodiments of routers therefore prebuild the Next_Hop_Label_Stacks[ ] and map it to the flow identifier. In that case, the ingress router executes the method shown in FIGS. 14 and 15 for every packet in the multicast flow.

Figure 16:
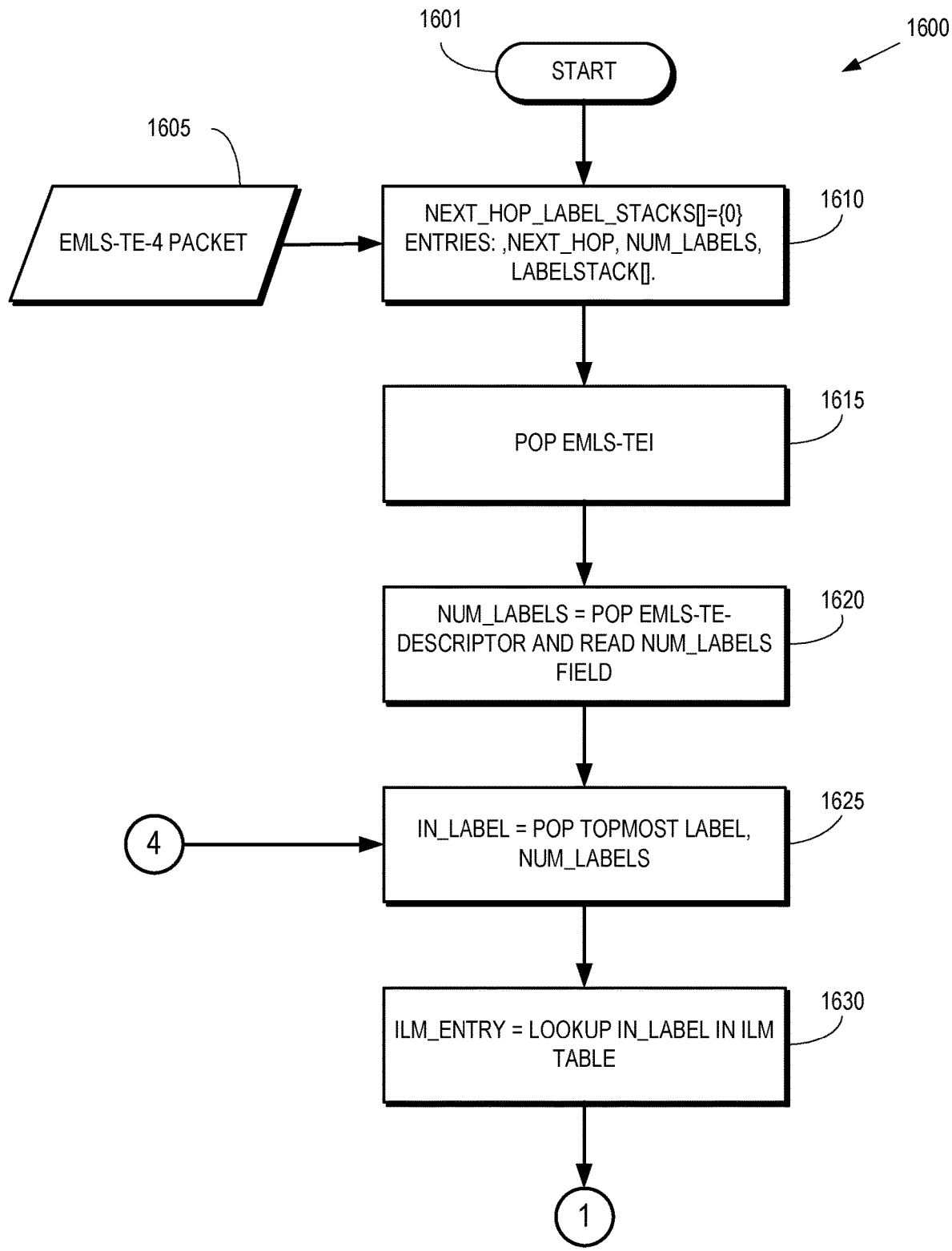
FIG. 16 is a flow diagram of a first portion of a method of processing EMLS-TE packets at a router according to some embodiments.

FIG. 16 is a flow diagram of a first portion 1600 of a method of processing EMLS-TE packets at a router according to some embodiments. The method is implemented in some embodiments of the routers 111 shown in FIG. 4.

The method begins at the block 1601. The input 1605 to the method includes an EMLS-TE packet that is multicast in the context of the multicast flow.

At block 1610, the router initializes an empty Next_Hop_Label_Stacks[ ], which is a list of entries of type <NextHop, Num_Labels, LabelStack[ ]>. An entry contains the label stack of the swapped labels (of TE-LSPs) partitioned to a specific next-hop. At block 1615, the router pops the EMLS-TEI from the packet. At block 1620, the router pops the EMLS-TE descriptor and reads the NumLabel field from the EMLS-TE descriptor. At block 1625, the router pops the topmost label from the packet. At block 1630, the router looks up the label in ILM Table to get its next-hop and label information.

Figure 17:
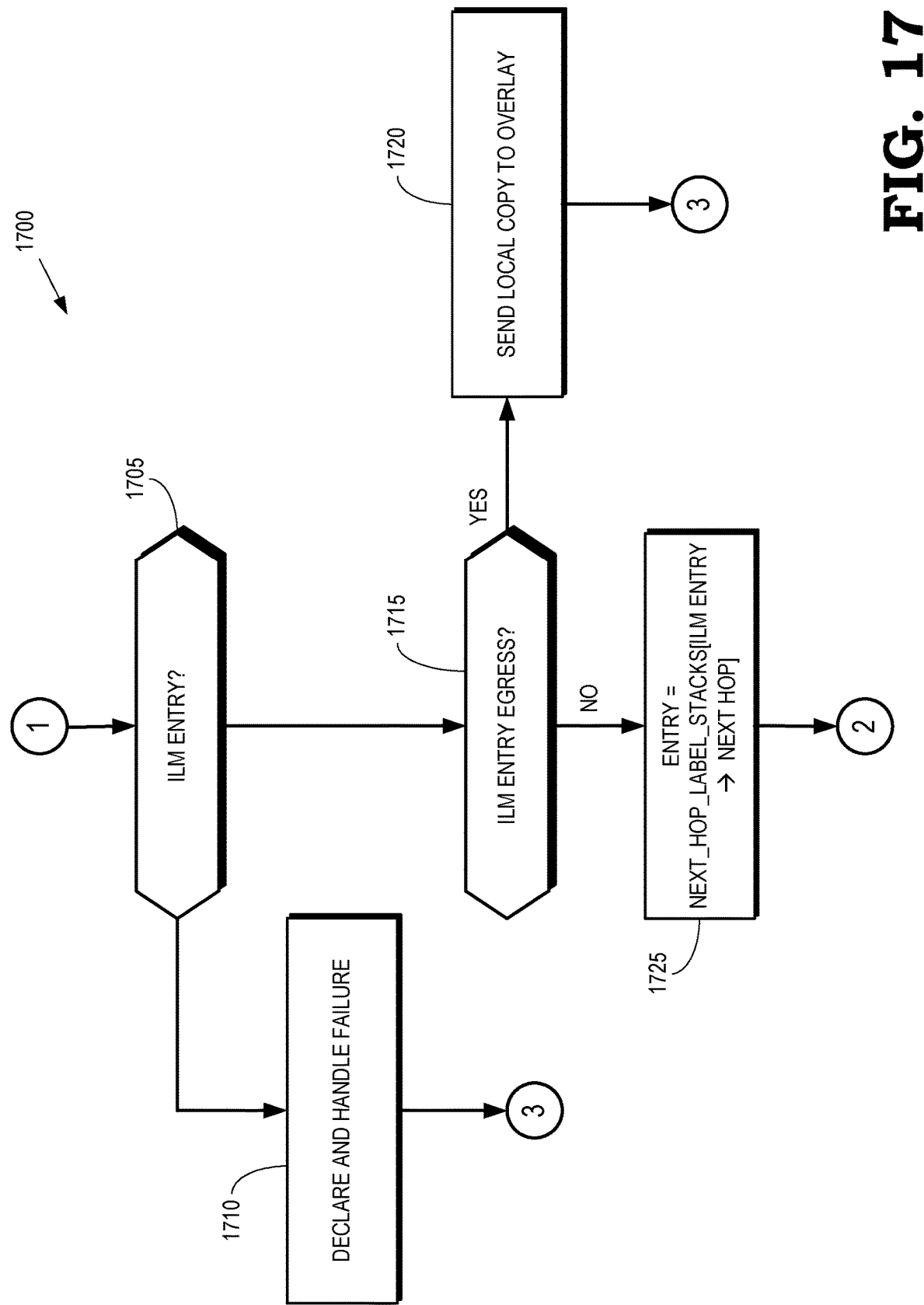
FIG. 17 is a flow diagram of a second portion of the method of processing the EMLS-TE packets at the router according to some embodiments.

The block 1630 is connected to the decision block 1705 in FIG. 17 via the node 1.

FIG. 17 is a flow diagram of a second portion 1700 of the method of processing the EMLS-TE packets at the router according to some embodiments. The decision block 1705 in FIG. 17 is connected to the block 1630 in FIG. 16 via the node 1.

At decision block 1705, the router determines whether an ILM entry is found. If not found, the method flows to the block 1710 and the router declares and handles failure for the label. The method then flows to the node 3, which connects the block 1710 with the decision block 1815 in FIG. 18. If an ILM entry is found, the method flows to decision block 1715.

At decision block 1715, the router determines whether the ILM entry indicates that the router is an egress router for the multicast flow. If so, the method flows to the block 1720. Otherwise, the method flows to the block 1725.

At block 1720, the router makes a local copy of the packet, removes all remaining labels of EMLS-TE-4, and then delivers the packet to the multicast flow overlay. The method then flows to the node 3, which connects the block 1720 with the decision block 1815 in FIG. 18.

At block 1725, the router retrieves the entry in Next_Hop_Label_Stacks[ ] for the next-hop in the ILM entry. If entry does not exist, then an entry is created for the next hop. The method then flows to the node 2, which connects the block 1725 with the block 1805 in FIG. 18.

Figure 18:
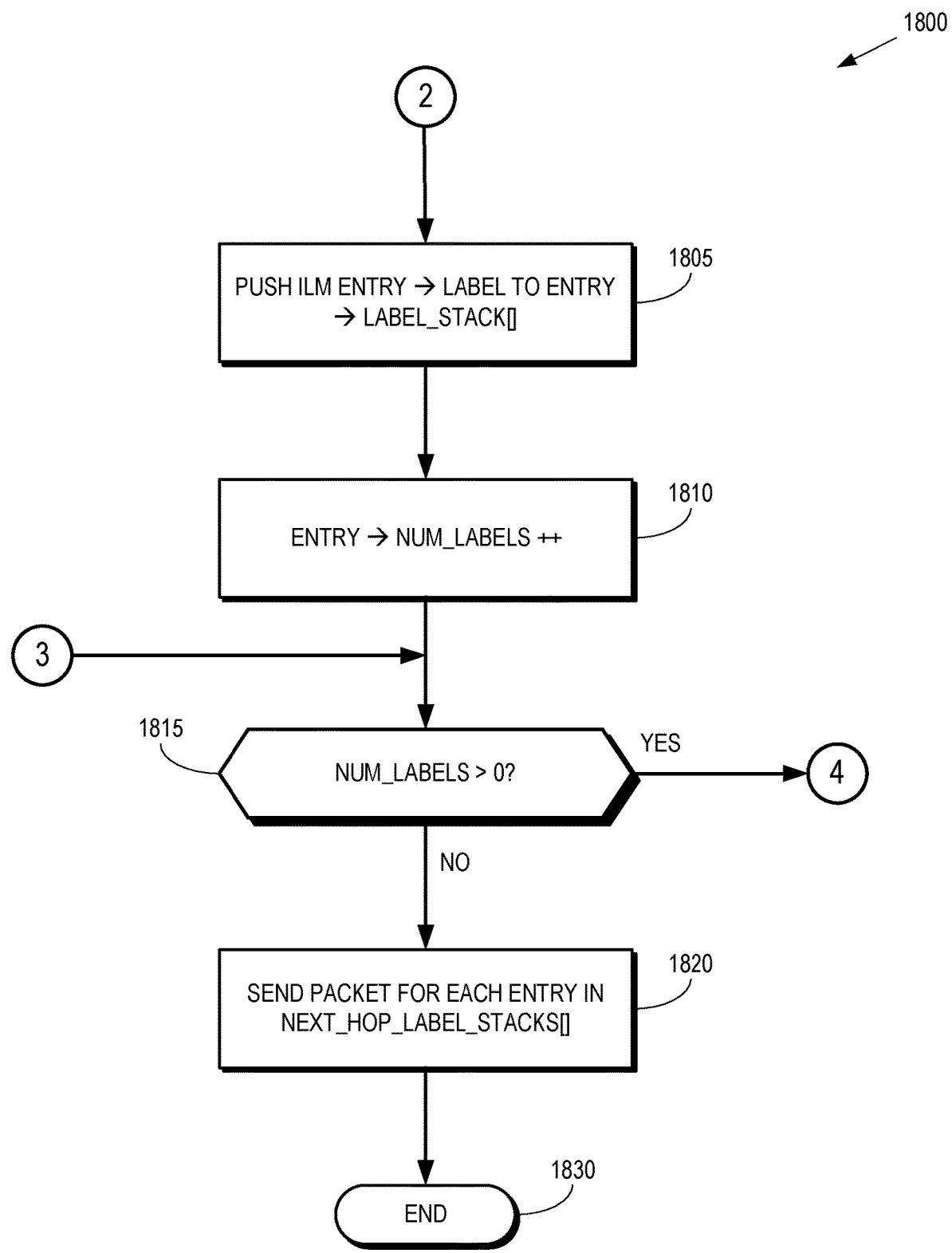
FIG. 18 is a flow diagram of a third portion of the method of processing the EMLS-TE packets at the router according to some embodiments.

FIG. 18 is a flow diagram of a third portion 1800 of the method of processing the EMLS-TE packets at the router according to some embodiments. The block 1805 in FIG. 18 is connected to the block 1725 in FIG. 17 via the node 2. The decision block 1815 is connected to the blocks 1710, 1720 in FIG. 17 via the node 3.

At block 1805, the router pushes the next-hop label of the ILM entry into the entry in Next_Hop_Label_Stacks[ ]. At block 1810, the router increments the label count in the next-hop's entry in Next_Hop_Label_Stacks [ ] because a label was pushed in block 1805.

At decision block 1815, the router determines whether there are more labels in the EMLS-TE-4 label stack. If so, the method flows to the node 4, which connects the decision block 1815 with the block 1625 in FIG. 16. If there are no additional labels, the method flows to the block 1820. The block 1820 is reached when all swapped labels are partitioned by their next hops in Next_Hop_Label_Stacks [ ].

At block 1820, the router sends an EMLS-TE-4 packet for each entry in Next_Hop_Label_Stacks [ ]. Some embodiments of the block 1820 are implemented using the method shown in FIGS. 14 and 15. The method then flows to the block 1830 and the method ends.

Figure 19:
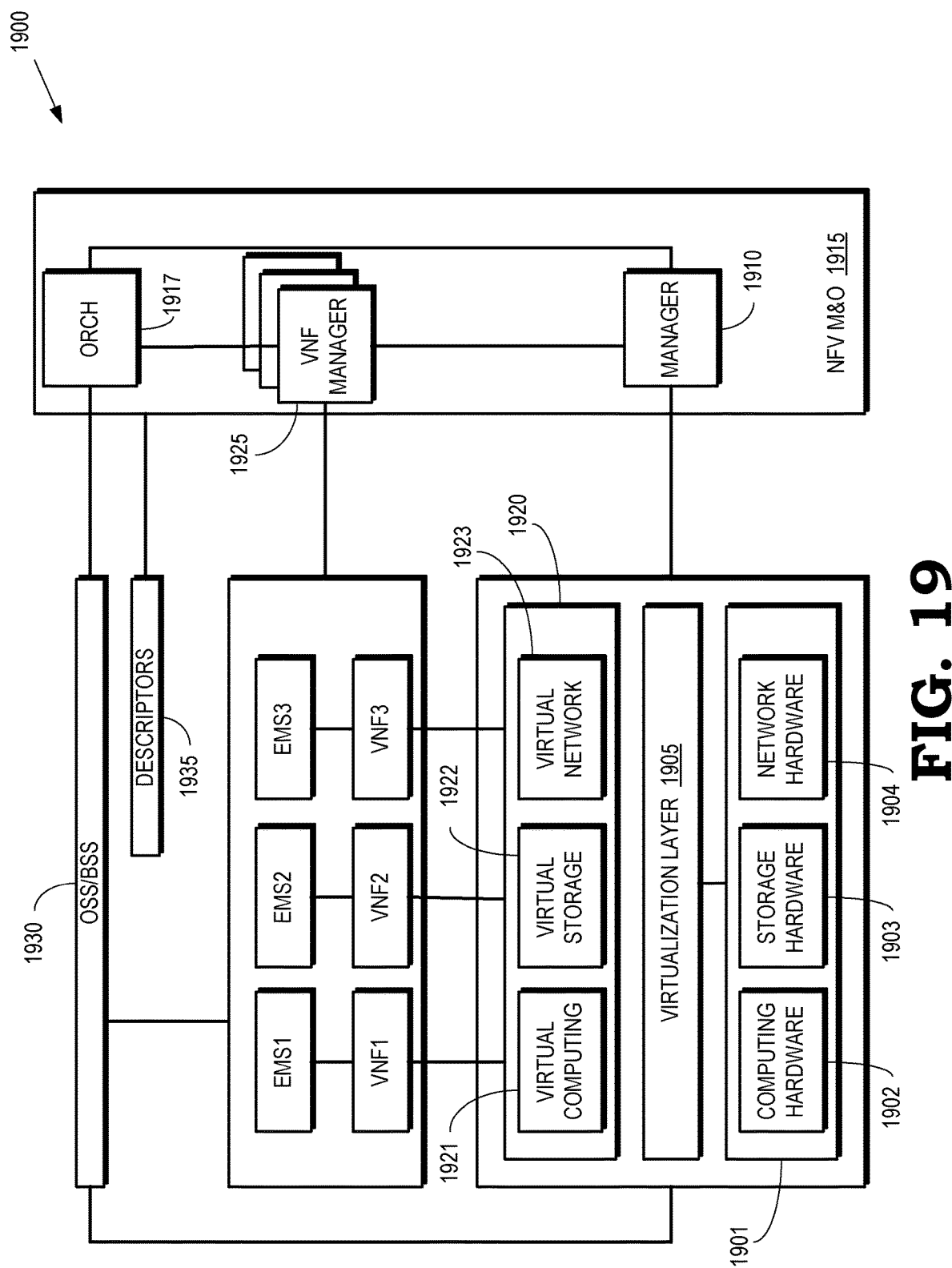
FIG. 19 is a block diagram of a network function virtualization (NFV) architecture according to some embodiments.

FIG. 19 is a block diagram of a network function virtualization (NFV) architecture 1900 according to some embodiments. The NFV architecture 1900 is used to implement some embodiments of the communication system 400 shown in FIG. 4. The NFV architecture 1900 includes hardware resources 1901 including computing hardware 1902, storage hardware 1903, and network hardware 1904. The computing hardware 1902 is implemented using one or more processors, the storage hardware 1903 is implemented using one or more memories, and the network hardware 1904 is implemented using one or more transceivers, transmitters, receivers, interfaces, and the like.

A virtualization layer 1905 provides an abstract representation of the hardware resources 1901. The abstract representation supported by the virtualization layer 1905 can be managed using a virtualized infrastructure manager 1910, which is part of the NFV management and orchestration (M&O) module 1915. Some embodiments of the manager 1910 are configured to collect and forward performance measurements and events that may occur in the NFV architecture 1900. For example, performance measurements may be forwarded to an orchestrator (ORCH) 1917 implemented in the NFV M&O 1915. The hardware resources 1901 and the virtualization layer 1905 may be used to implement virtual resources 1920 including virtual computing resources 1921, virtual storage resources 1922, and virtual networking resources 1923.

Virtual networking functions (VNF1, VNF2, VNF3) run over the NFV infrastructure (e.g., the hardware resources 1801) and utilize the virtual resources 1920. For example, the virtual networking functions (VNF1, VNF2, VNF3) may be implemented using virtual machines supported by the virtual computing resources 1921, virtual memory supported by the virtual storage resources 1922, or virtual networks supported by the virtual network resources 1923. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 1925 that exchanges information and coordinates actions with the manager 1910 or the orchestrator 1917.

In the illustrated embodiment, the NFV architecture 1900 includes an operation support system (OSS)/business support system (BSS) 1930. The OSS/BSS 1930 deals with network management including fault management using the OSS functionality. The OSS/BSS 1930 also deals with customer and product management using the BSS functionality. Some embodiments of the NFV architecture 1900 use a set of descriptors 1935 for storing descriptions of services, virtual network functions, or infrastructure supported by the NFV architecture 1900. Information in the descriptors 1935 may be updated or modified by the NFV M&O 1915.

The NFV architecture 1900 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 1800 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  a) hardware-only circuit implementations (such as implementations and only analog and/or digital circuitry) and
  b) combinations of hardware circuits and software, such as (as applicable):
    i. a combination of analog and/or digital hardware circuit(s) with software/firmware and
    ii. any portions of a hardware processor(s) with software (including digital signal processor(s), software, and memory(ies) that work together to cause an apparatus, such as a mobile phone or server, to perform various functions) and
  c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining unicast paths from an ingress router for a network to egress routers from the network based on quality-of-service (QoS) metrics for links between routers of the network;
   associating a subset of the unicast paths with a multicast flow based on at least one QoS criteria for the multicast flow;
   pushing a label stack onto a packet of the multicast flow, the label stack comprising labels that identify the subset of the unicast paths; and
   multicasting the packet comprising the label stack.

2. The method of claim 1, wherein determining the unicast paths from the ingress router to the egress routers comprises determining the unicast paths based on at least one of configured bandwidths of the links, available bandwidths of the links, delays associated with the links, latencies associated with the links, colors associated with the links, and affinities associated with the links.

3. The method of claim 1, wherein associating the subset of the unicast paths with the multicast flow comprises identifying the subset of the unicast paths that meet the at least one QoS criteria for the multicast flow.

4. The method of claim 3, wherein associating the subset of the unicast paths with the multicast flow comprises reoptimizing at least one of the unicast paths based on the QoS criteria for the multicast flow in response to being unable to identify at least one of the unicast paths that meets the QoS criteria for the multicast flow.

5. The method of claim 3, wherein associating the subset of the unicast paths with the multicast flow comprises configuring at least one new unicast path to the egress routers that meets the QoS criteria for the multicast flow.

6. The method of claim 1, wherein multicasting the packet comprises forwarding at least one copy of the packet to at least one next hop router in the network.

7. The method of claim 1, wherein each label in the label stack represents one of the unicast paths to one of the egress routers, and wherein a number of labels in the label stack equals a number of the egress routers.

8. A method comprising:
   receiving, at a router in a network, a packet in a multicast flow, wherein the packet comprises a label stack of labels that identify a subset of unicast paths from an ingress router for the network to egress routers from the network, and wherein the subset of the unicast paths is determined based on quality-of-service (QoS) metrics for links between routers of the network and at least one QoS criteria for the multicast flow;
   selectively modifying the label stack in the packet based on the labels that identify the subset of the unicast paths; and
   selectively forwarding the packet based on the labels.

9. The method of claim 8, further comprising:
   parsing the label stack in response to receiving the packet; and
   comparing information in the label stack to entries in a table that indicates labels associated with at least one of the router and an adjacency to a neighbor router.

10. The method of claim 9, further comprising:
    removing the label stack from the packet in response to the label stack indicating that the router is one of the egress routers for the multicast flow; and
    forwarding the packet without the label stack to a multicast overlay.

11. The method of claim 10, wherein the multicast overlay is a virtual private network (VPN).

12. The method of claim 9, further comprising:
    forwarding at least one copy of the packet to at least one next hop shared by at least one of the subset of unicast paths indicated by at least one label in the label stack.

13. The method of claim 12, wherein forwarding the at least one copy of the packet comprises modifying the label stack by swapping a label of the router with a new label to a corresponding next hop and forwarding the at least one copy of the packet including the modified label stack to the corresponding next hop.

14. An apparatus comprising:
    a memory configured to:
      store labels of unicast paths from an ingress router for a network to egress routers from the network that are determined based on quality-of-service (QoS) metrics for links between routers of the network;
    a processor configured to:
      associate a subset of the unicast paths with a multicast flow based on at least one QoS criteria for the multicast flow, and
      push a label stack onto a packet of the multicast flow, the label stack comprising labels that identify the subset of the unicast paths; and
    a transceiver configured to multicast the packet comprising the label stack.

15. The apparatus of claim 14, wherein the transceiver is configured to transmit a request to a software defined networking (SDN) controller for information identifying the labels of the unicast paths and store the information received from the SDN in the memory.

16. The apparatus of claim 14, wherein the processor is configured to determine the unicast paths based on the QoS metrics for the links.

17. The apparatus of claim 14, wherein the unicast paths from the ingress router to the egress routers are determined based on at least one of configured bandwidths of the links, available bandwidths of the links, delays associated with the links, latencies associated with the links, colors associated with the links, and affinities associated with the links.

18. The apparatus of claim 14, wherein the processor is configured to identify the subset of the unicast paths that meet the at least one QoS criteria for the multicast flow.

19. The apparatus of claim 18, wherein at least one of the unicast paths is reoptimized based on the QoS criteria for the multicast flow in response to the processor being unable to identify at least one of the unicast paths that meets the QoS criteria for the multicast flow.

20. The apparatus of claim 18, wherein at least one new unicast path to the egress routers that meets the QoS criteria for the multicast flow is configured in response to the processor being unable to identify at least one of the unicast paths that meets the QoS criteria for the multicast flow.

21. The apparatus of claim 14, wherein the transceiver is configured to forward at least one copy of the packet to at least one next hop router in the network.

22. The apparatus of claim 14, wherein each label in the label stack represents one of the unicast paths to one of the egress routers, and wherein a number of labels in the label stack equals a number of the egress routers.

23. A router for deployment in a network, the router comprising:
- a transceiver configured to receive a packet in a multicast flow, wherein the packet comprises a label stack of labels that identify a subset of unicast paths from an ingress router for the network to egress routers from the network, and wherein the subset of the unicast paths is determined based on quality-of-service (QoS) metrics for links between routers of the network and at least one QoS criteria for the multicast flow; and
- a processor configured to selectively modify the label stack in the packet based on the labels that identify the subset of the unicast paths, and
- wherein the transceiver is configured to selectively forward the packet based on the labels.

24. The router of claim 23, wherein the processor is configured to:
- parse the label stack in response to receiving the packet; and
- compare information in the label stack to entries in a table that indicates labels associated with at least one of the router and an adjacency to a neighbor router.

25. The router of claim 24, wherein the processor is configured to remove the label stack from the packet in response to the label stack indicating that the router is the egress router for the multicast flow, and wherein the transceiver is configured to forward the packet without the label stack to a multicast overlay.

26. The router of claim 25, wherein the multicast overlay is a virtual private network (VPN).

27. The router of claim 23, wherein the transceiver is configured to forward at least one copy of the packet to at least one next hop shared by at least one of the subset of unicast paths indicated by at least one label in the label stack.

28. The router of claim 27, wherein the processor is configured to modify the label stack to swap a label of the router with a new label to a corresponding next hop, and wherein the transceiver is configured to forward the at least one copy of the packet including the modified label stack to the corresponding next hop.

29. An apparatus comprising:
- at least one processor; and
- at least one memory including computer program code;
- the at least one memory and the computer program code configured to, with the at least one processor, cause the apparatus at least to perform:
  - determining unicast paths from an ingress router for a network to egress routers from the network based on quality-of-service (QoS) metrics for links between routers of the network;
  - associating a subset of the unicast paths with a multicast flow based on at least one QoS criteria for the multicast flow;
  - pushing a label stack onto a packet of the multicast flow, the label stack comprising labels that identify the subset of the unicast paths; and
  - multicasting the packet comprising the label stack.

30. An apparatus comprising:
- at least one processor; and
- at least one memory including computer program code;
- the at least one memory and the computer program code configured to, with the at least one processor, cause the apparatus at least to perform:
  - receiving, at a router in a network, a packet in a multicast flow, wherein the packet comprises a label stack of labels that identify a subset of unicast paths from an ingress router for the network to egress routers from the network, and wherein the subset of the unicast paths is determined based on quality-of-service (QoS) metrics for links between routers of the network and at least one QoS criteria for the multicast flow;
  - selectively modifying the label stack in the packet based on the labels that identify the subset of the unicast paths; and
  - selectively forwarding the packet based on the labels.

\* \* \* \* \*